(12) United States Patent
Boudreau et al.

(10) Patent No.: US 9,516,551 B2
(45) Date of Patent: Dec. 6, 2016

(54) INTERFERENCE MITIGATION OF D2D COMMUNICATIONS IN DIFFERENT COVERAGE SCENARIOS

(71) Applicant: Telefonaktiebolaget L M Ericsson (publ), Stockholm (SE)

(72) Inventors: Gary Boudreau, Kanata (CA); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/418,583

(22) PCT Filed: Jan. 29, 2015

(86) PCT No.: PCT/EP2015/051824
§ 371 (c)(1),
(2) Date: Jan. 30, 2015

(87) PCT Pub. No.: WO2015/114052
PCT Pub. Date: Aug. 6, 2015

(65) Prior Publication Data
US 2016/0037385 A1 Feb. 4, 2016

Related U.S. Application Data

(60) Provisional application No. 61/934,027, filed on Jan. 31, 2014.

(51) Int. Cl.
*H04W 28/18* (2009.01)
*H04W 48/16* (2009.01)
(Continued)

(52) U.S. Cl.
CPC ............ *H04W 28/18* (2013.01); *H04W 4/005* (2013.01); *H04W 48/16* (2013.01); *H04W 76/023* (2013.01)

(58) Field of Classification Search
CPC ... H04W 28/18; H04W 48/16; H04W 4/005; H04W 76/023
See application file for complete search history.

(56) References Cited

U.S. PATENT DOCUMENTS

2012/0281573 A1* 11/2012 Kazmi ............... H04W 8/26
  370/252
2013/0051368 A1* 2/2013 Liu .................. H04W 36/0022
  370/331

(Continued)

FOREIGN PATENT DOCUMENTS

WO  2006016328 A1  2/2006
WO  2006016331 A1  2/2006

OTHER PUBLICATIONS

General Dynamics Broadband UK, "Preconfigured Parameters for Out of Coverage Public Safety D2D Communication", 3GPP Draft; R2-134244, 3rd Generation Partnership Project (3GPP), XP050736988, Nov. 13, 2013, 3 pages.

(Continued)

*Primary Examiner* — Brian D Nguyen
(74) *Attorney, Agent, or Firm* — Rothwell, Figg, Ernst & Manbeck, P.C.

(57) ABSTRACT

The embodiments herein relate to a method in a first D2D UE (101) arranged for performing a D2D operation with at least one second D2D UE (101'). The first D2D UE (101) acquires one or more coverage specific parameters for use by the first D2D UE (101) for the D2D operation. The first D2D UE (101) determines the network coverage scenario in which the first D2D UE (101) is operating or is expected to operate. The first D2D UE (101) selects one or more coverage specific parameters belonging to the acquired one or more coverage specific parameters. The first D2D UE (101) uses the selected one or more coverage specific parameters for performing the D2D operation in the determined network coverage scenario.

30 Claims, 10 Drawing Sheets

(51) Int. Cl.
*H04W 4/00* (2009.01)
*H04W 76/02* (2009.01)

(56) References Cited

U.S. PATENT DOCUMENTS

| | | | | |
|---|---|---|---|---|
| 2014/0286305 A1* | 9/2014 | Yamada | ............... | H04W 36/165 |
| | | | | 370/331 |
| 2014/0307642 A1* | 10/2014 | Wanstedt | ............ | H04W 76/023 |
| | | | | 370/329 |
| 2015/0049663 A1* | 2/2015 | Mukherjee | ............ | H04W 16/26 |
| | | | | 370/315 |
| 2015/0117309 A1* | 4/2015 | Gage | ..................... | H04W 8/005 |
| | | | | 370/328 |
| 2015/0141000 A1* | 5/2015 | Yilmaz | ............... | H04W 76/023 |
| | | | | 455/426.1 |

OTHER PUBLICATIONS

LG Electronics, "Discussion on D2D Communication and Scheduling Method", 3GPP Draft, R1-135483, 3rd Generation Partnership Project (3GPP), XP050750683, Nov. 11-15, 2013, 4 pages.

Nokia, NSN, "D2D Communication without network coverage", 3GPP Draft; R1-133495, 3rd Generation Partnership Project (3GPP), XP050716602, Aug. 19-23, 2013, 6 pages.

International Search Report and Written Opinion issued in corresponding international application No. PCT/EP2015/051824, dated Apr. 7, 2015, 13 pages.

\* cited by examiner

INTERFERENCE MITIGATION OF D2D COMMUNICATIONS IN DIFFERENT COVERAGE SCENARIOS

CROSS-REFERENCE TO RELATED APPLICATION

This application is a 35 U.S.C. §371 National Phase Entry Application from PCT/EP2015/051824, filed Jan. 29, 2015, and designating the United States, which claims priority to U.S. Provisional Application No. 61/934,027, filed Jan. 31, 2014. The above-identified applications are incorporated by reference in their entirety.

TECHNICAL FIELD

The embodiments herein relate to methods and arrangements in cellular mobile communication systems, in particular in relation to Device-to-device (D2D) operation, D2D communication, network coverage, co-existence, radio emissions, and interference mitigation.

BACKGROUND

Direct device-to-device or peer-to-peer communication can be exploited in cellular networks to improve the overall network capacity as well as to mitigate coverage holes for user terminals (e.g. User Equipment's (UE)) or other network connected devices (e.g. Machine to Machine (M2M) devices) that do not have network coverage. For simplicity, UE will be used throughout this document as meaning any type of wireless network connected device. The performance and advantages of such D2D communications is currently an active topic of investigation in the Third Generation Partnership Project (3GPP) Radio Access Network (RAN).

The D2D communication may be bi-directional communication where both devices receive and transmit in the same or different resources. However, a D2D communication scenario may also comprise that one of the devices transmits and the other one receives the signals. There may also exist a point-to-multipoint (e.g. multicast, broadcast) scenario in which case a plurality of devices receive signals from the same transmitting device. This scenario is particularly useful for emergency services or public safety operations to spread vital information to several devices in an affected area. The term D2D communication and D2D operation are interchangeably used herein.

Devices typically operate under the supervision of a radio access network with radio access nodes (e.g. base station). But in some scenarios the devices themselves establish direct communication constituting the radio access network, without the intervention of the network infrastructure.

In cellular network assisted D2D communications (or simply network assisted D2D communications), UEs in the vicinity of each other can establish a direct radio link (e.g. referred to as a D2D bearer). While UEs communicate over the D2D "direct" bearer, they also maintain a cellular connection with their respective serving base station (e.g. evolved NodeB (eNB)). This direct link is interchangeably called as NetWork (NW) link, D2D-NW link etc. The NW link is used for e.g. resource assignment for D2D communication, maintenance of radio link quality of D2D communication link etc.

Three relevant coverage scenarios for D2D communication are shown in FIG. 1. The left most scenario illustrates partial coverage, the middle scenario illustrates in coverage and the right most scenario illustrates out of coverage.

In coverage: This scenario is the middle scenario in FIG. 1. In this scenario, all D2D UEs 101 communicating are under the network node coverage. This means that the D2D UEs 101 can receive signals from and/or transmit signals to at least one network node 102. In this case, the D2D UE 101 can maintain a communication link with the network node 102. The network node 102 in turn can ensure that the D2D communication does not cause unnecessary interference. In coverage is also interchangeably called In-Network (IN) coverage. In FIG. 1, the network coverage is illustrated with a circle. There are two D2D UEs 101 communicating in FIG. 1, e.g. UE A and UE B. Since both UE A and UE B 101 are within the circle, they are both in coverage of the network node 102. The arrow between the D2D UEs 101 illustrates the D2D communication. The network node 102 which the D2D UEs 101 can receive signals from and/or transit signals to is exemplified with a base station in FIG. 1.

Out of coverage: This scenario is the right most scenario in FIG. 1. In this scenario, D2D UEs 101 communicating with each other are not under network node 102 coverage. This means that the D2D UEs 101 cannot receive signals from and/or transmit signals to any network node 102. Typically, the lack of coverage is due to complete absence of the network coverage in the vicinity of the D2D UEs 101. However, the lack of coverage may also be due to insufficient resources in the network nodes 102 to serve or manage the D2D UEs 101. Therefore in this scenario the network cannot provide any assistance to the D2D UEs 101. The out of coverage is also interchangeably called Out-Of-Network (OON) coverage. In FIG. 1, the out of coverage scenario is illustrated with two D2D UEs 101, e.g. UE A and UE B. The absence of any network node 102 in FIG. 1, illustrates that the D2D UEs 101 are out of coverage from any network node 102. The arrow between the D2D UEs 101 illustrates the D2D communication.

Partial coverage: This scenario is the left most scenario in FIG. 1. In this scenario at least one D2D UE 101 communicating is under the network coverage, and at least one D2D UE 101 communicating is not under the network coverage. As mentioned above the D2D UE 101 not being under the network coverage can be due to lack of any network node 102 in its vicinity or due to insufficient resources in any of the network nodes 102 in its vicinity. The partial coverage is also interchangeably called as Partial-Network (PN) coverage. The network node 102 coverage is illustrated with a circle in FIG. 1. There are two D2D UEs 101 seen in FIG. 1. UE A 101 is seen to be outside the circle, i.e. it is out of coverage, and UE B 101 is inside the circle, i.e. it under coverage. The arrow between the D2D UEs 101 illustrates the D2D communication. The network node 102 which the D2D UEs 101 can receive signals from and/or transit signals to is exemplified with a base station in FIG. 1.

The emissions outside the Band Width (BW) or frequency band of the D2D UE 101 are often termed as out of band emissions or unwanted emissions. The major Out-Of-Band (OOB) and spurious emission requirements are typically specified by the standard bodies and eventually enforced by the regulators in different countries and regions for both the D2D UE 101 and the network nodes 102 (e.g. a base station).

Examples of the OOB emissions are Adjacent Channel Leakage Ratio (ACLR) and Spectrum Emission Mask (SEM). Typically, these requirements ensure that the emission levels outside the transmitter channel bandwidth or operating band remain several tens of decibels (dB) below the transmitted signal.

For the D2D UE 101, the conservation of its battery power is very critical. This requires that the D2D UE 101 has an efficient Power Amplifier (PA). The PA is therefore typically designed for certain typical operating points or configurations or set of parameter settings e.g. modulation type, number of active physical channels (e.g. resource blocks in Evolved-Universal Terrestrial Radio Access (E-UTRA) or number of Code Division Multiple Access (CDMA) channelization codes code/spreading factor in Universal Terrestrial Radio Access (UTRA)). To ensure that the D2D UE 101 fulfills OOB/spurious requirements for all allowed UpLink (UL) transmission configurations, the D2D UE 101 is allowed to reduce its maximum UL transmission power in some scenarios. This is called Maximum Power Reduction (MPR) or UE power back-off in some literature. For instance, a D2D UE 101 with maximum transmit power of 24 dBm power class may reduce its maximum power from 24 dBm to 23 or 22 dBm depending upon the configuration.

In E-UTRA, an Additional-Maximum Power Reduction (A-MPR) for the D2D UE transmitter has also been specified in addition to the normal MPR. The A-MPR can vary between different cells, operating frequency bands and more specifically between cells deployed in different location areas or regions. In particular, the A-MPR may be applied by the UE in order to meet the additional emission requirements imposed by regional regulatory organizations. A-MPR is an optional feature which is used by the network when needed depending upon the co-existence scenario. The A-MPR defines the D2D UE maximum output power reduction (on top of the normal MPR) needed to fulfill certain emission requirements by accounting for factors such as: bandwidth, frequency band or resource block allocation. The A-MPR is therefore controlled by the network node 102 by signaling to the D2D UE 101 a parameter called Network Signaling (NS) parameter. For example, NS_01 and NS_02 correspond to different levels of pre-defined A-MPRs.

Even in case of network assisted D2D communication, the network may not fully manage the interference. Therefore, there exists a potential for D2D communications to cause interference to both serving cellular networks as well as in legacy co-located networks or co-existing networks in the same geographical region.

In Long Term Evolution (LTE), potential D2D interference can be intra-frequency co-channel interference—i.e. collisions between transmitted Resource Blocks (RBs) within the system bandwidth, as well as interference from in-band emissions from the transmitting RBs within the system bandwidth into adjacent RBs to those RBs being employed for the desired transmission. In addition, D2D communications can result in inter-device and intra-device interference across a number of channels in LTE including for example Physical Uplink Control Channel (PUCCH) and Physical Uplink Shared Channel (PUSCH) channels. The D2D communication typically takes place over LTE uplink channels such as PUCCH/PUSCH or similar channels. These are described below:

Inter-Device Interference

The inter-device interference scenario is explained with an example comprising two devices, A and B, which communicate via D2D communication in given subframes 2, 3 and 4 on the UL e.g. on UL spectrum in Frequency Division Duplex (FDD). In these subframes, the device B receives information from device A in a first set of RBs. Also during these subframes the device C transmits to an eNodeB, in UL resources in the same system bandwidth as B is receiving D2D communication from A, but in a second set of RBs. In this example, the second set of resources is a PUCCH transmission in subframe 2 and a PUSCH transmission in subframe 3.

Due to in-band emissions, device C will create a "high interference" area where B is possibly unable to decode data from A. This "high interference" area will be a function of:

Device C's transmit output power.
The path loss from device C to device B.
Device C's RB allocation.
The receive power level of device B and the D2D RB allocation.
Device C's in-band emission levels at the frequency of the D2D RB allocation.

Such inter-device interference scenarios can clearly occur in both partial and full coverage scenarios. It is also possible that it could occur in "no-coverage" scenarios if for example devices A and B are both out of coverage and device C is within coverage but close to the edge of coverage and close to devices A and B, such that it can still create an exclusion zone for these devices.

Based on the D2D Work Item Description (WID) and the current proposals under discussion in RAN1, D2D transmissions can be broadly classified into discovery or communications transmissions. Since PUCCH transmissions in general are pre-assigned with a fixed periodicity, the PUCCH transmissions could potentially impact both the discovery and the communications phases of D2D. However, with regard to PUSCH transmissions, the PUSCH transmissions of device C could be scheduled to avoid the discovery phase of the D2D transmissions, but likely not the D2D transmissions during the communications phase. The interference zone due to the in-band emissions for these inter-device scenarios can be quite large, potentially in the order of 10 s or 100 s of meters.

Intra-Device Interference

Intra-Device interference is related to the case when a device A is transmitting simultaneously both to a nearby device B using D2D communication in a first set of resource blocks, and transmitting to a network node 102 using a second set of RBs. An example scenario for this would be when a device A transmits a beacon signal (or pilot signal) and simultaneously transmits a PUCCH to the network node 102, but other scenarios may also exist. Note that the intra-device interference will be limited to full and partial coverage scenarios.

As noted previously, there also exists the potential for D2D communications to cause interference to both serving cellular networks as well as legacy networks especially which are co-located with the serving cellular networks. The interference may also be caused to the networks, which co-exist in the same geographical areas where D2D UEs 101 operate.

Scenario 1 illustrated in FIG. 2a and scenario 2 illustrated in FIG. 2b below cover the use cases in which regular LTE UL transmissions act as an aggressor or interferer to D2D transmissions both for the victim D2D UE 101 being out-of-network coverage (scenario 1, FIG. 2a) and in-network or partial coverage (scenario 2, FIG. 2b). The LTE transmissions can be for both FDD and Time Division Duplexing (TDD) implementations. In FIGS. 2a and 2b, the dot indicates the transmission interfered with, the solid arrow indicates the interferer, the dashed arrow indicates the desired D2D transmission and the dotted arrow indicates the desired LTE transmission. The network node 102 is exemplified with an eNB 102 in FIGS. 2a and 2b.

As mentioned above, scenario 1 in FIG. 2a covers LTE FDD and LTE TDD. Four UE's 101 are illustrated in FIG. 2a, i.e. A, B, C and D. Two of the UEs 101, e.g. B and C, are in coverage of the eNB 102 (they are illustrated as being inside the circle which represents the network coverage). Two of the UEs 101, e.g. A and D are out of coverage of the eNB 102 (they are illustrated as being outside the circle which represents the network coverage). The aggressor (also referred to as interferer) is UE C 101 which performs an LTE UL transmission to the eNB 102, indicated with the dotted arrow in FIG. 2a. UE B 101, UE C 101 and UE D 101 are interferers, indicated with solid arrows. The victims are the in-coverage receiver UE B and the out-of-coverage receiver UE D. The desired D2D transmission between the UE A 101 and the UE B 101 and UE D 101 are interfered, indicated with a dot on the dashed arrows.

As mentioned above, scenario 2 in FIG. 2b covers LTE FDD and LTE TDD. Scenario 2 is similar to scenario 1, except that the D2D transmission is in coverage in scenario 2. Four UE's 101 are also illustrated in FIG. 2b, i.e. A, B. C and D. Two eNBs 102 are illustrated in FIG. 2b, eNB1 and eNB 2. Each of the eNBs 102 has its own coverage area indicated with a circle. UE A 101 and UE B 101 are in coverage of eNB1 102 and UE C 101 is in coverage of eNB2 102. UE D 101 does not have any network coverage.

UE C 101 is the aggressor which have an LTE UL transmission with eNB2 102, indicated with a dotted arrow in FIG. 2a. The D2D victims are the UE B 101 which is in coverage of eNB1 and UE D 101 which is out of coverage. UE C 101 is an interferer, indicated with solid arrows. UE B 101 and UE D 101 are interfered by UE C 101. The desired D2D transmission between the UE A 101 and the UE B and UE D are interfered, indicated with a dot on the dashed arrows.

Scenario 3 illustrated in FIG. 3a and scenario 4 illustrated in FIG. 3b cover the use cases in which a D2D transmission acts as an aggressor or interferer to LTE transmissions on the DL (i.e. LTE DL is the victim) for the D2D UE 101 being out-of-network coverage (scenario 3) and in-network or partial coverage (scenario 4). Note that these interference scenarios can only occur when the LTE network is operating in TDD duplex mode and the D2D transmission is not synchronized to the LTE network. For an FDD LTE network, since the D2D transmissions are on the UL, no co-channel interference will occur on the FDD DL channel, however interference to co-located co-existing networks can occur. In FIGS. 3a and 3b, the dot indicates the transmission interfered with, the solid arrow indicates the interferer, the dashed arrow indicates the desired D2D transmission and the dotted arrow indicates the desired LTE transmission. The network node 102 is exemplified with an eNB in FIGS. 3a and 3b.

As mentioned above, scenario 3 in FIG. 3a covers only LTE TDD. FIG. 3a illustrates three UEs 101, e.g. A, B and C. UE A 101 is in coverage of the eNB 102 (indicated by that UE A 101 is inside the circle representing the coverage area of eNB 102). UE B and C 101 are out of coverage from eNB 102 (indicated by that they are outside the circle representing the coverage area of eNB 102). The aggressor (also referred to as the interferer) is UE B 101 which is the D2D transmitter that is out of coverage. The victim is UE A 101 receiving LTE DL data from the eNB 102, indicated with the dotted arrow in FIG. 3a. Note that there is no synchronization between UE B 101 and eNB 102. The UE B 101 transmitting might cause interference to UE A 101.

As mentioned above, scenario 4 in FIG. 3b covers only LTE TDD. Scenario 4 is similar to scenario 3, except that the interferer is in coverage in scenario 4. FIG. 3b illustrates three UEs 101 where UE A and B 101 are in coverage of eNB1 102 and UE C is in coverage of eNB2 102. The UE B 101 is the interferer and the D2D transmitter is in coverage. UE C 101 is the victim and receives LTE DL data in another cell. Note that there is no synchronization between the UE B 101 and the eNB1 102. The UE B 101 transmitting might cause interference to the UE A 101.

The interfering situation becomes worse when D2D UEs 101 are in partial network coverage or even worse when they are completely out of network coverage. This may lead to the following problems:

The performance may be severely degraded.
The D2D communication may not be sustained.
Regulatory requirements on radio emissions may not be met by the D2D UE 101.

Typically, D2D UEs 101 involved in D2D operation also maintain communication links with the network node 102. This communication link (aka network link or D2D UE-network link) enables the D2D UEs 101 to efficiently maintain their D2D operation. However, the network link may be fully or partially lost due to various reasons such as network disruption, unavailability of resources etc. This in turn will either degrade or terminate the D2D operation.

SUMMARY

It is an object to obviate at least some of the above disadvantages and provide improved node(s) and method(s) for wireless telecommunication networks.

The document discloses methods, which would enable D2D UEs to continue with their D2D operation under partial or full loss of the network coverage.

The embodiments herein comprise embodiments which are applicable to a network node and also a D2D UE. The D2D UE may be pre-configured with parameters which are specific to a particular coverage (e.g. IN, OON and PN coverage scenarios). The D2D UE determines its current coverage scenario, selects the corresponding parameters applicable to the determined coverage and uses them for D2D operation, e.g. D2D communication.

Some steps performed in a first D2D UE arranged for performing a D2D operation with at least one second D2D UE comprise:
Acquiring one or more coverage specific parameters for use by the first D2D UE for D2D operation. The same type of parameter may have different values for use in different coverage scenarios.
Determining (e.g. based on one or more criteria) the network coverage scenario in which the first D2D UE is operating or is expected to operate.
Selecting one or more coverage specific parameters belonging to the acquired one or more coverage specific parameters. The selected one or more coverage specific parameters are applicable to the determined coverage scenario of the first D2D UE.
Using the selected one or more coverage specific parameters for performing the D2D operation in the determined network coverage scenario.

The first D2D UE arranged to communicate in a D2D wireless communication of performing a D2D operation with at least one second D2D UE may comprise:
A processing unit.
A memory storage unit.
A communication interface.

The processing unit is arranged to operate instruction sets stored in the memory storage unit for communicating with the at least one second D2D UE via the communication interface. The processing unit is further arranged for:

Acquiring one or more coverage specific parameters for use by the first D2D UE for the D2D operation. The same type of parameter may have different values for use in different network coverage scenarios.

Determining (e.g. based on one or more criteria) the network coverage scenario in which the first D2D UE is operating or is expected to operate.

Selecting one or more coverage specific parameters belonging to the acquired one or more coverage specific parameters. The selected one or more coverage specific parameters are applicable to the determined network coverage scenario of the first D2D UE.

Using the selected one or more coverage specific parameters for performing the D2D operation in the determined network coverage scenario.

Some steps performed in a network node handling a cell (e.g. a wireless cell), wherein D2D communication may be operated between D2D UEs comprise:

Determining at least one coverage specific parameter for use by the D2D UE in different coverage scenarios.

Transmitting at least one of the determined coverage specific parameters to the D2D UE.

The network node comprises:
A processing unit.
A memory unit.
At least one communication interface.

The processing unit is arranged to operate instruction sets stored in the memory unit to communicate wirelessly with the first D2D UE. The processing unit is further arranged for:

Determining at least one coverage specific parameter for use by the first D2D UE in different coverage scenarios.

Transmitting at least one of the determined coverage specific parameters to the first D2D UE.

The embodiments described above leads to at least one of the following advantages:

The embodiments herein enable a D2D UE to more efficiently continue the D2D communication regardless of the type of coverage in which the D2D communication takes place.

The transmissions of the D2D UEs do not cause unnecessary or any additional degradation to the other UEs and/or network nodes when operating in PN or OON coverage scenarios.

The D2D UEs can continue their operation in a public safety situation, e.g. when network nodes are unavailable or partially available.

The network node does not have to always maintain a communication link with D2D UEs though D2D operation can continue. The network node may have resource constraints due to lack of resources, heavy load and a disaster situation.

Further advantages of the embodiments herein will appear from the following detailed description.

BRIEF DESCRIPTION OF THE DRAWINGS

In the following the embodiments herein will be described in a non-limiting way and in more detail with reference to exemplary embodiments illustrated in the enclosed drawings, in which.

DETAILED DESCRIPTION

Figure 1:
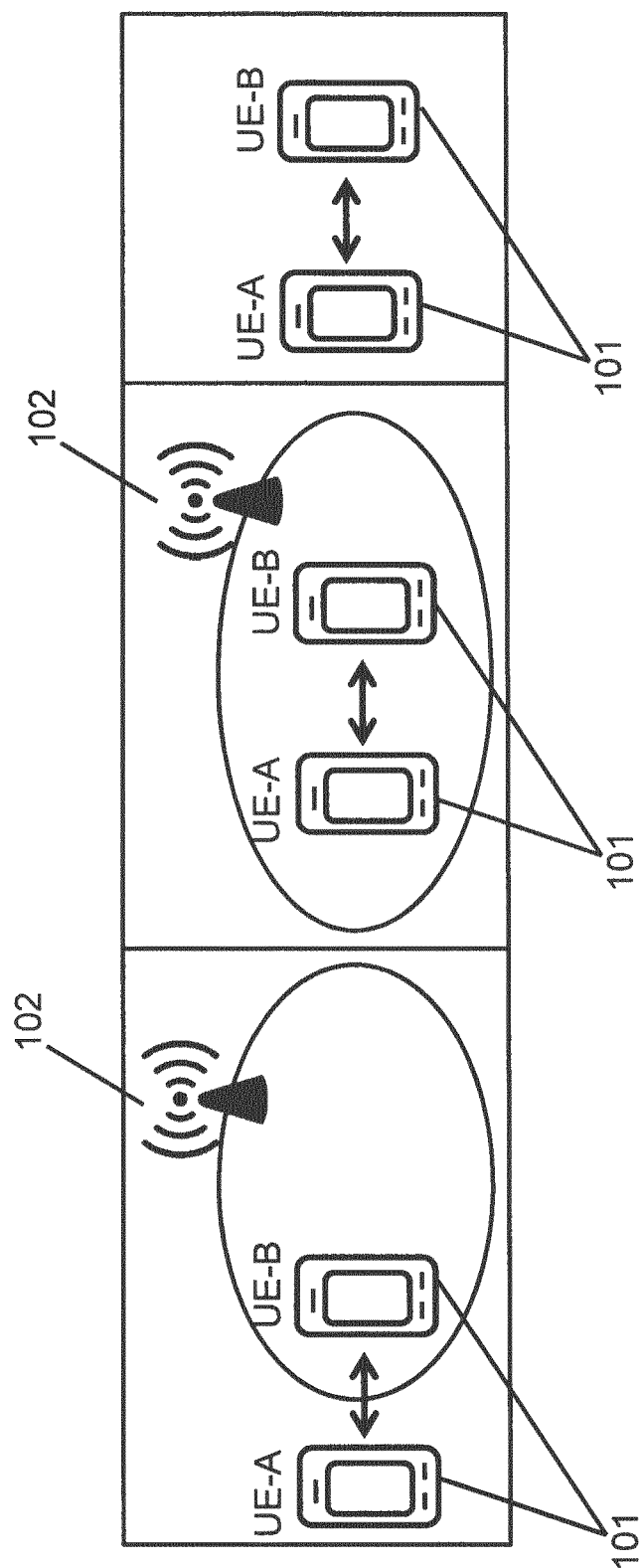
FIG. 1 illustrate schematically exemplary different coverage scenarios according to the embodiments herein.
Figure 2A:
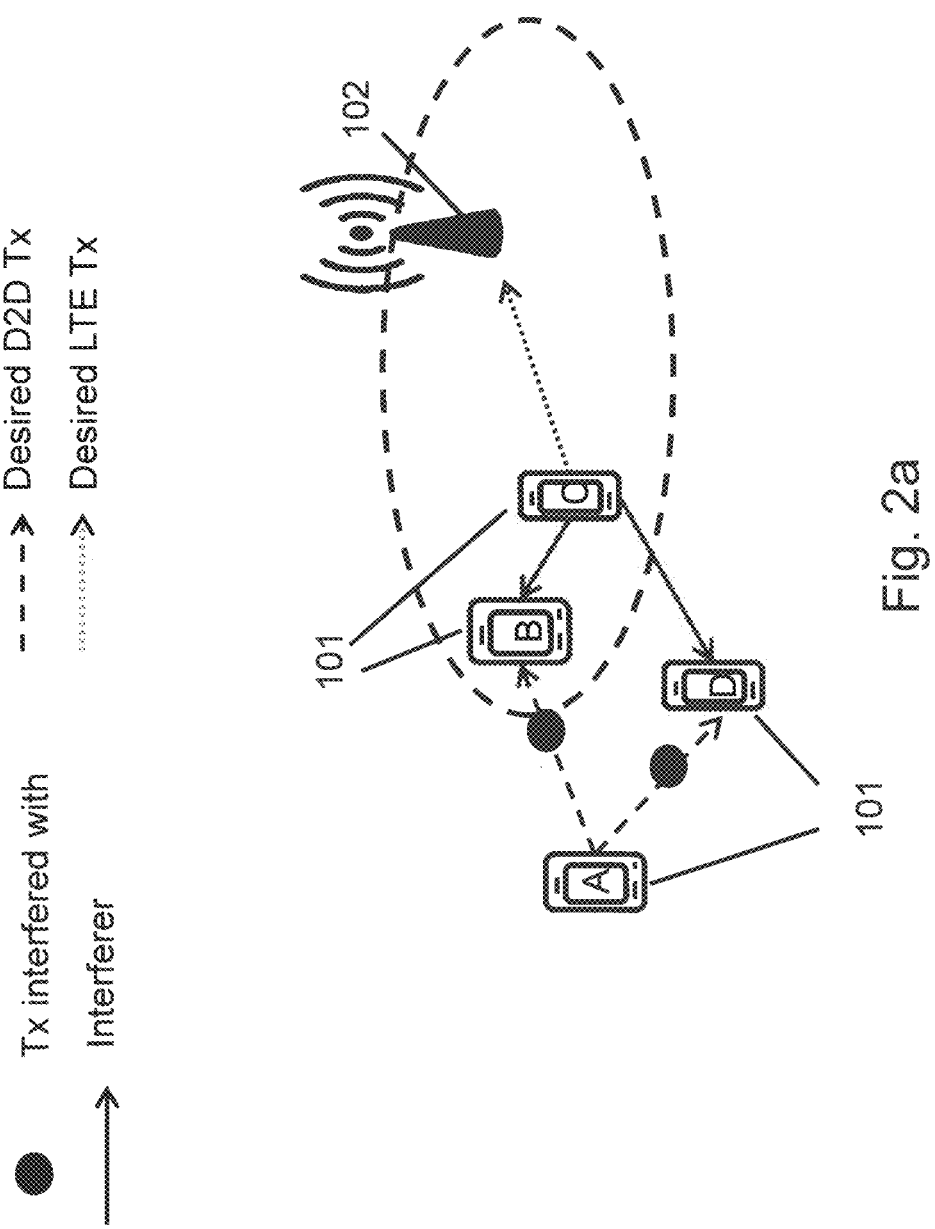
FIGS. 2a and 2b illustrate schematically exemplary scenarios according to the embodiments herein.
Figure 2B:
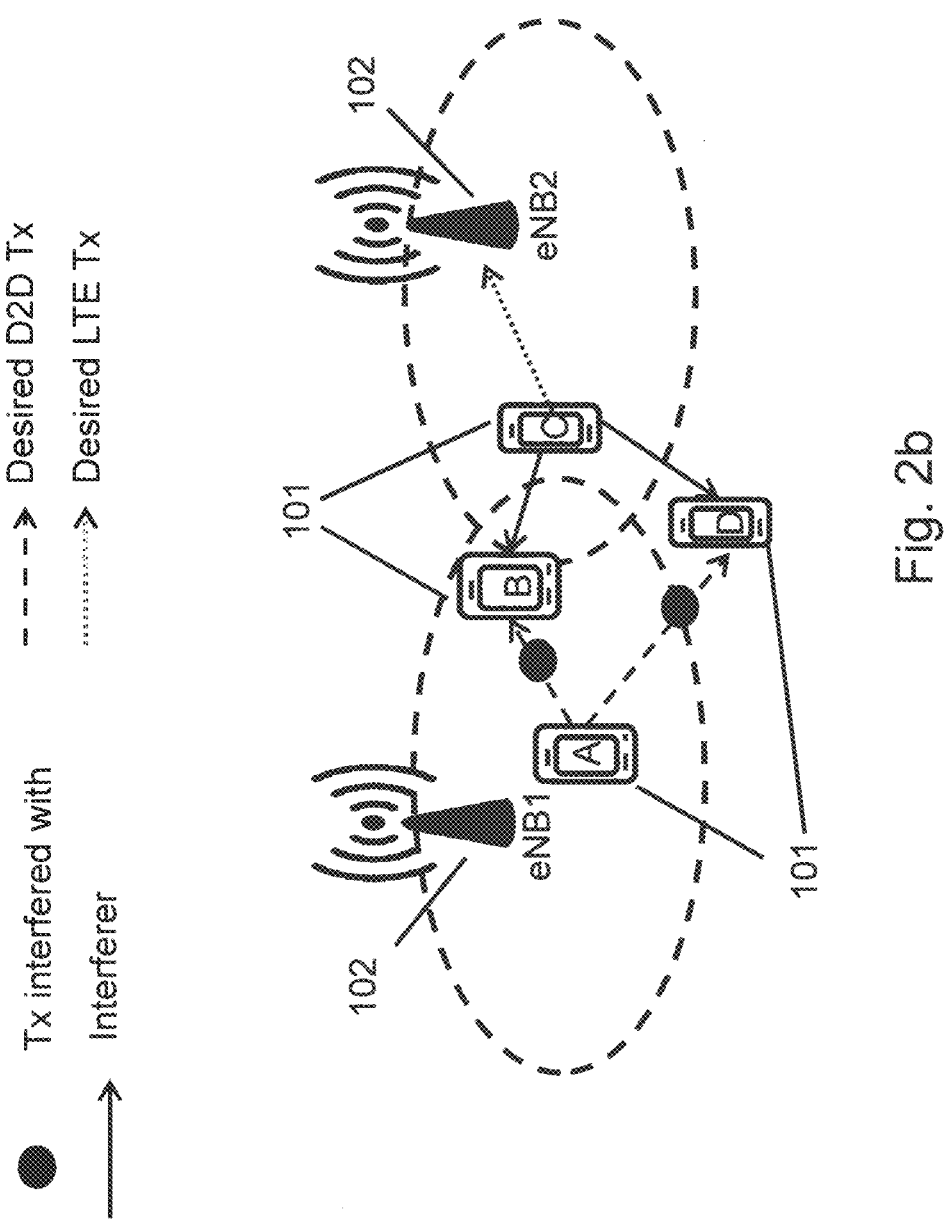
Figure 3A:
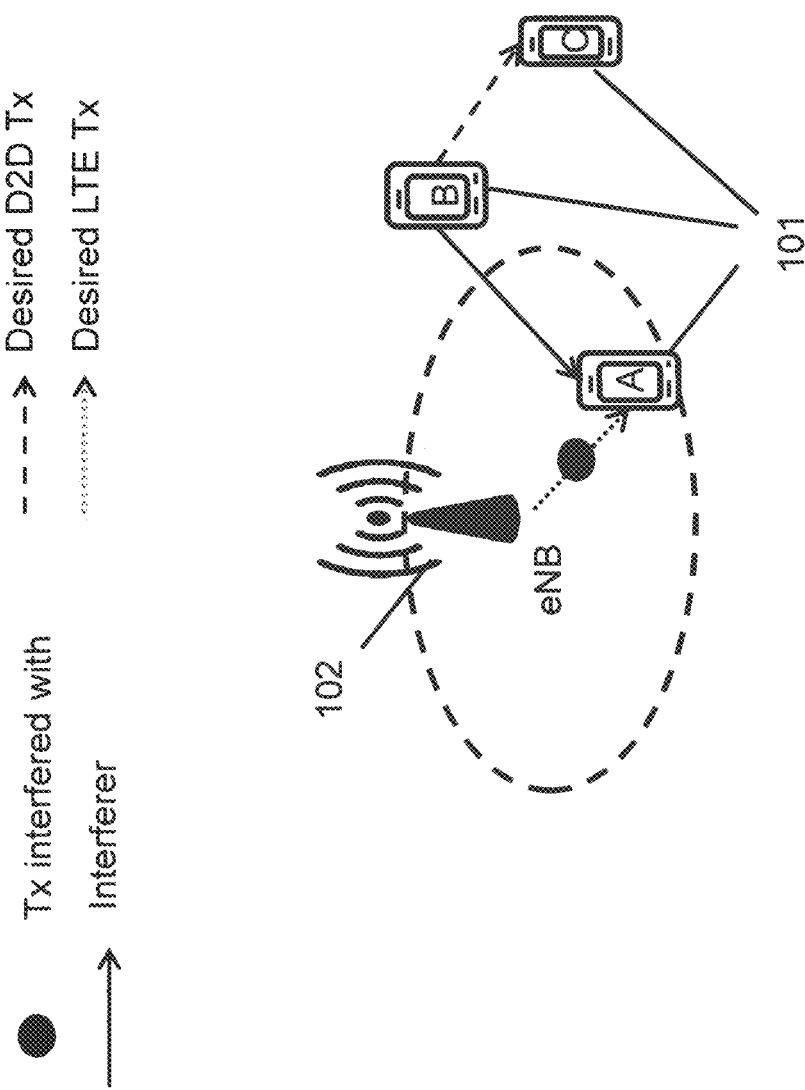
FIGS. 3a and 3b illustrate schematically exemplary scenarios according to the embodiments herein.
Figure 3B:
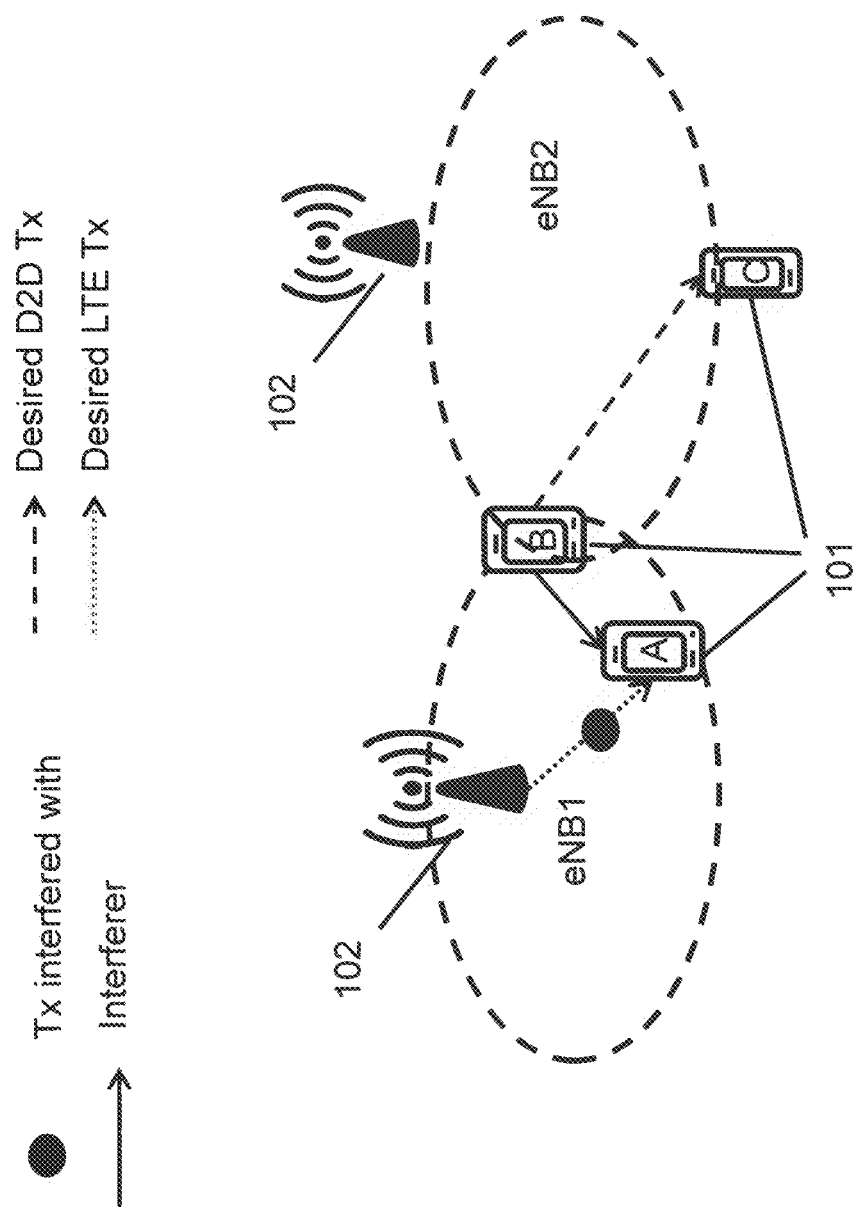
Figure 4:
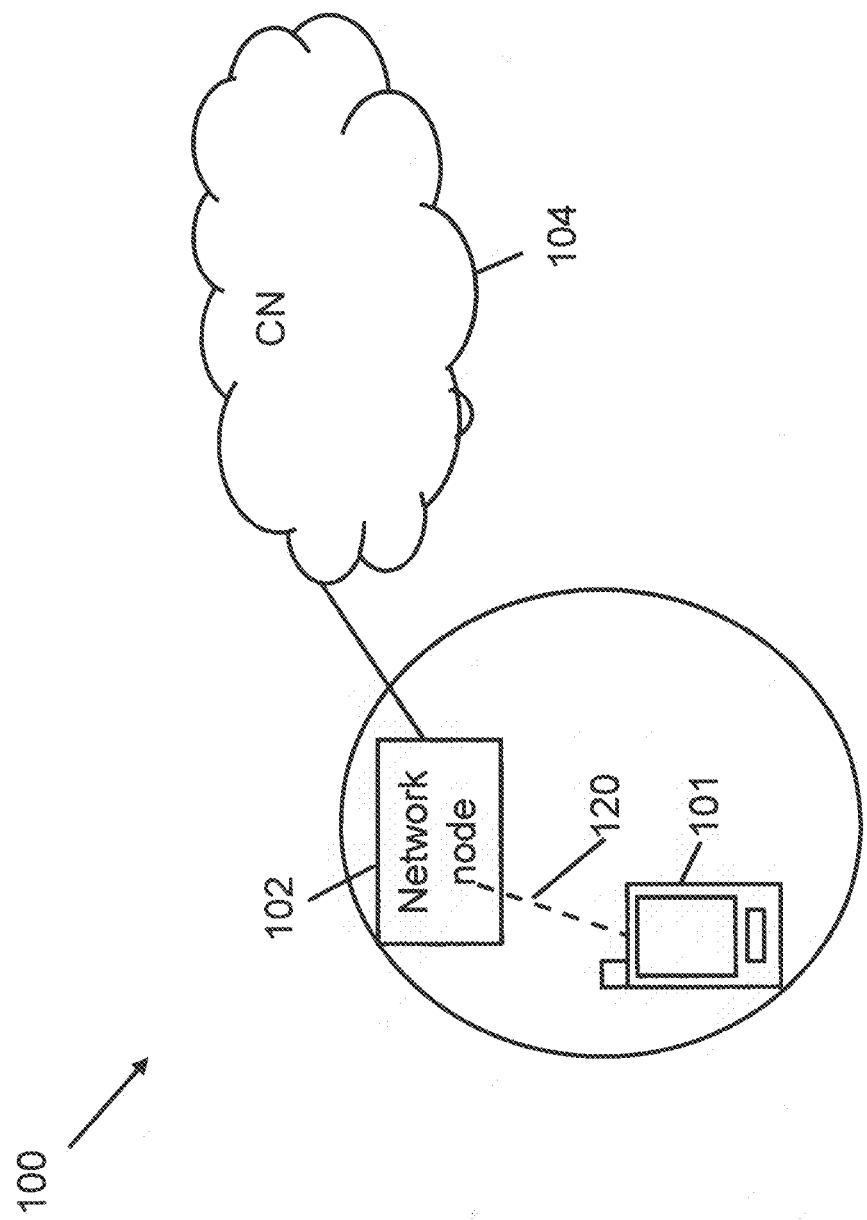
FIG. 4 is a schematic block diagram illustrating an example network according to the embodiments herein.

In FIG. 4, reference numeral 100 indicates a cellular, optionally packet based, telecommunications infrastructure network according to a first embodiment of the embodiments herein. A UE 101 communicates via a wireless communication link 120 with a network node 102. The network node 102 communicates with a Core Network (CN) 104. The core network 104 handles charging, authentication, and connection to other communication devices and/or application services such as for instance Internet based services. The wireless communication link 120 may for example be based on LTE or similar standard.

The embodiments also use a generic term 'UE' 101. However a UE 101 can be any type of wireless device, which is capable of at least D2D communication through wireless communication with another UE 101' (not illustrated in FIG. 4, but in FIG. 7). The UE 101 may in such case be referred to as the first UE 101 and the other UE 101' may be referred to as the second UE. The D2D communication may also be referred to as Proximity Service (ProSe) communication or D2D operation. Examples of such UEs 101 are D2D UE, ProSe UE, sensor, modem, smart phone, Machine Type Communication (MTC) device aka M2M device, PDA, iPAD, Tablet, smart phone, Laptop Embedded Equipped (LEE), Laptop Mounted Equipment (LME), Universal Serial Bus (USB) dongles, a terminal, mobile/cellular phone, smart phone, Pocket Digital Assistant (PDA), tablet computer, laptop, personal computer. Internet of Things (IoT) device, a D2D capable UE, a communications device, a D2D communication device, a wireless communication device or a ProSe UE or other device capable of wireless communication, e.g. non-user related equipment such as devices in M2M communication. These terms may be used interchangeably in this document.

The embodiments herein use a generic term 'network node' 102 that may be any kind of network node. The network node 102 may serve or manage a D2D UE 101. Examples of the network node 102 are a radio access device, a radio access network device, an eNB. NodeB, base station, wireless Access Point (AP), base station controller, radio network controller, relay, donor node controlling relay, Base Transceiver Station (BTS), transmission points, transmission nodes, Remote Radio Unit (RRU), Remote Radio Head (RRH), nodes in Distributed Antenna System (DAS), core network node, Mobility Management Entity (MME), or similar network infrastructure access device. These terms may be used interchangeably in this document.

Figure 5A:
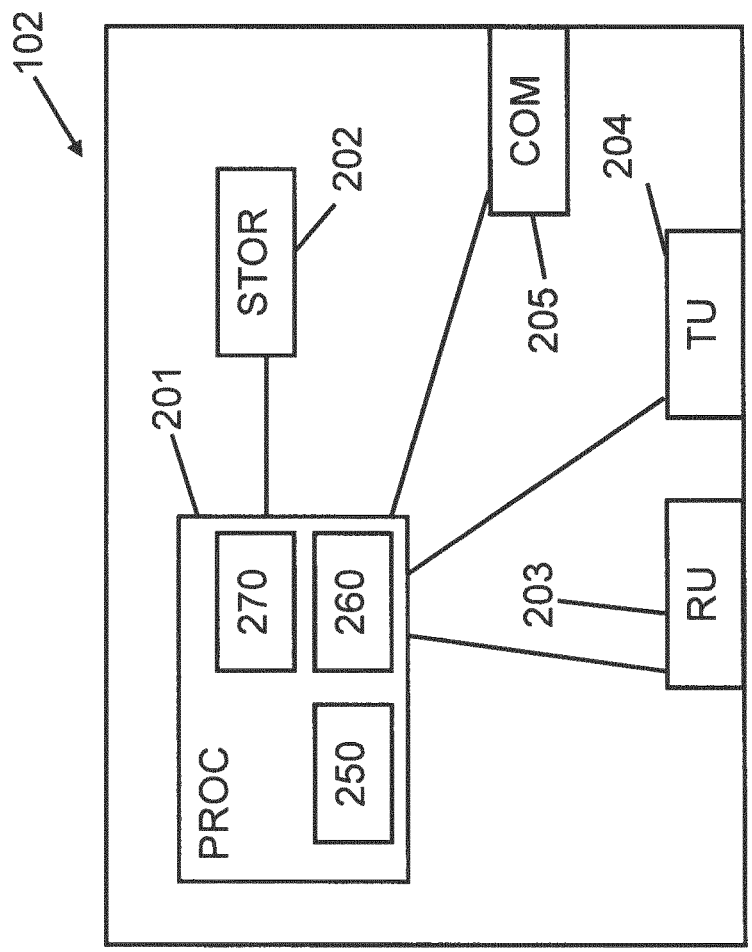
FIG. 5a,b are schematic block diagrams illustrating exemplary devices according to the embodiments herein wherein 2a is an infrastructure node and 2b is a UE/terminal node.

The network node 102, e.g. eNodeB, comprises as is shown in FIG. 5a, at least one processing unit 201 (called PROC in FIG. 5a), optionally one or more computer readable memory units 202 (called STOR in FIG. 5a) connected to the processing unit 201, at least one Receiving Unit (RU) 203, and at least one Transmitting Unit (TU) 204 each connected to the processing unit 201. Furthermore, the eNodeB 102 also comprises a data communications interface 205 (called COM1 in FIG. 5a) for communicating with the core network 104 (not seen in FIG. 5a, but in FIG. 4). The processing unit 201 is arranged to receive and transmit control and/or data packets using the receiving and transmitting units 203, 204. The processing unit 201 is arranged to control data flow and operations according to the embodiments herein within the eNodeB 102 between the memory unit 202, the receiving unit 203, the transmitting unit 204, a detection unit, and the communication interlace 205 and within the processing unit 201 itself depending on functionality operated. The receiving unit 203 and transmitting unit 204 have been exemplified with two physical interfaces. However, it should be understood that it could be one physical interface or more than two physical interfaces depending on the configuration. The communication interface 205 may comprise an Ethernet interface or an Asynchronous Transfer Mode (ATM) interface. The processing unit 201 may comprise for instance a microprocessor, an Application Specific Integrated Circuit (ASIC), a Digital Signal Processor (DSP), or a Field Programmable Gate Array (FPGA). The memory unit 202 may comprise any suitable volatile and/or non-volatile memory in a single unit or as a combination of units, the memory 202 may comprise for instance a solid state memory, e.g. Solid State Drive (SSD), a Random Access Memory (RAM) of any type, a Hard Disk (HD), and so on. In case the processing unit 201 is arranged to operate instructions sets, such as the case of the processing unit 201 being for instance a microprocessor or DSP, the processing unit 201 may then be arranged to operate instruction sets stored as software in the computer readable memory unit. It should be noted that a D2D UE 101 can also be described using the description for FIG. 5a.

Figure 5B:
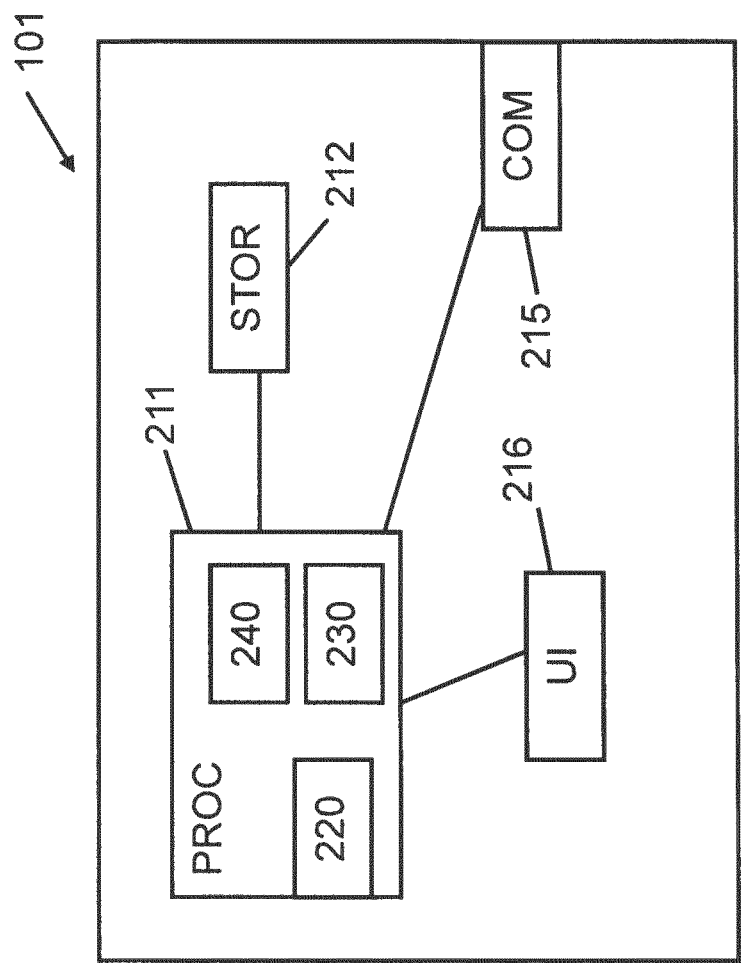

With reference to FIG. 5b, the D2D UE 101 also comprises a processing unit 211 (called PROC in FIG. 5b) arranged to operate instruction sets, stored in a memory 212 (called STOR in FIG. 5b), for handling an optional User Interface (UI) 216, and communicating wirelessly with a network node 102 or other D2D UEs 101 via a communication interface 215 (called COM in FIG. 5b). The examples used for processing unit 211 and memory 212 in relation to the network node 102 are also applicable for the D2D UE 101. In some embodiments, the memory 212 may also be referred to as memory storage unit. The communication interface 215 may be a suitable wireless radio technology such as for instance LTE based but also Wideband Code Division Multiple Access (WCDMA), UTRA FDD, UTRA TDD, GSM/GERAN/EDGE, or similar. GSM is short for Global System for Mobile Communications, GERAN is short for GSM EDGE Radio Access Network and EDGE is short for Enhanced Data Rates for GSM Evolution. The processing unit 211 may comprise an acquiring module 220, a determining module 230, and an operating module 240 for using acquired and determined parameters as will be discussed in this document. The acquiring module 220 may also be referred to as an obtaining module. As seen in FIG. 5a, the processing unit 201 of the network node 102 may in a similar manner comprise an acquiring module 250, a determining module 260 and a transmission module 270 for transmitting acquired and determined parameters to a D2D UE 101. The acquiring module 250 of the network node 102 may also be referred to as an obtaining module.

The embodiments herein may be implemented in a network node 102 and a D2D UE 101. The network node 102 herein can be the serving network node of the D2D UE 101 or any network node with which the D2D UE 101 can establish or maintain a communication link 120 and/or receive information (e.g. via broadcast channel).

The embodiments are described when the D2D UE 101 is configured to be served by or operates with a single carrier (aka single carrier operation of the D2D UE 101) for D2D communication or configured to use or operate single carrier in a network node 102. However the embodiments are applicable for multi-carrier or carrier aggregation based D2D communication.

The embodiments herein may be as follows, which are described in the subsequent sections:
  General description of coverage specific parameters.
  Method in a D2D UE 101 of acquiring and using coverage specific parameters.
  Method in a network node 102 of determining and signaling coverage specific parameters.
  Method in a D2D UE 101 of signaling a capability related to acquiring and using coverage specific parameters.
General Description of Coverage Specific Parameters The D2D UE 101 operation related to D2D communication involves transmission and/or reception of radio signals, which are associated with one or more coverage specific parameters. The coverage specific parameters may also be referred to as corerage specific radio parameters. Examples of coverage specific parameters are receiver sensitivity, transmission power, transport format, MPR, A-MPR, P-Max-ProSe, additionalSpectrumEmissions-ProSe etc. P-Max-ProSe is used by the D2D UE 101 to limit the maximum transmit power of ProSe transmissions when operating out-of-coverage, and can be pre-configured differently for different ProSe carriers. The parameter additionalSpectrumEmissions-ProSe is used by the D2D UE 101 to adjust its transmission to meet the region-specific regulatory emission requirements when the D2D UE 101 is operating out-of-coverage, and can be pre-configured appropriately. The value of additionalSpectrumEmissions-ProSe will need to be specific to the ProSe band, ProSe carrier frequency, channel bandwidth, and geographical region. These suggested preconfigured values would then correspond to applicable regulatory and protection emission levels. The coverage specific parameters may also be referred to as RRC parameters, and they may be required to be pre-configured in a public safety D2D UE 101 to be used for out-of-coverage ProSe communications etc.

The D2D UE 101 may operate in any one of the following: IN coverage, OON coverage and PN coverage as discussed earlier in this document. In existing solutions, the D2D UE 101 uses the same values of coverage specific parameters regardless of the type of coverage in which it operates. Unlike the legacy approach, one of the main objectives of embodiments herein are that at least one parameter is specific to the coverage in which the D2D UE 101 operates. The remaining parameters may not necessarily depend upon the coverage and are therefore not coverage specific. Therefore, coverage or network coverage specific parameters (aka coverage related parameters) used by the D2D UE 101 depend upon the type of coverage in which the D2D UE 101 is operating or performing D2D communication.

The list of parameters which are coverage specific may be: pre-defined, configured by the network node 102 at the D2D UE 101 or broadcasted by the network node 102. For example, different values of the same parameter may be pre-defined to be used by the D2D UE 101 for different coverage scenarios, e.g. IN, OON and PN coverage. The coverage specific parameters can be related to radio transmission (i.e. radio transmission parameters) and/or radio reception (i.e. radio reception parameters).

Examples of parameters which can be coverage specific radio transmission parameters or transmitter parameters (aka Radio Frequency (RF) transmitter parameters) are: UE transmit power, UE maximum output power, UE minimum output power, UE OFF power (i.e. UE power after transmitter is OFF), UE MPR, A-MPR, ON/OFF time mask of uplink signals (e.g. Physical Random Access Channel (PRACH), Sounding Reference Signal (SRS), PUCCH, PUSCH etc.), transmit power tolerance or accuracy (e.g. absolute or relative power tolerance such as +/1 dB), transmit signal quality (e.g. Error Vector Magnitude (EVM), NS value controlling A-MPR, frequency error, carrier leakage (i.e. leakage of signal within bandwidth), in-band emissions, out of band emission, SEM, additional spectrum emission mask, ACLR, spurious emissions, additional spurious emissions, transmit intermodulation, time alignment error between signals from different carriers and/or different transmit antennas, transmission bandwidth, transport format (e.g. Modulation and Coding Scheme (MCS), number of transport block, size of transport block etc.), step size of power control, etc.

Examples of parameters which can be coverage specific radio reception parameters or receiver parameters are (aka RF receiver parameters): reference sensitivity power level (aka REFSENS), maximum input level, Adjacent Channel Selectivity (ACS), blocking characteristics (e.g. in-band blocking, out-of-band blocking, narrow band blocking, spurious response, receiver intermodulation (e.g. wide band intermodulation), spurious emissions, receiver image, reception bandwidth etc.

The coverage specific parameters may also be specific to or linked to frequency bands or channel bandwidth or both frequency bands and channel bandwidth. For example, different parameter values may be defined for different bands for different bandwidth or for both different bands and bandwidths.

Selection of Coverage Specific Parameters

The coverage specific parameters may be selected or determined. In some embodiments, the selection or determination may be based on pre-defined criteria (also referred to as rules). The selection or determination may be done by the D2D UE 101 itself and/or configured or signaled by the network node 102.

The selection or determination of one or more coverage specific parameters in a particular coverage scenario may also depend upon one or more of the following factors:

The criticality level of the D2D operation e.g. a public safety situation (high criticality level), an emergency call (medium or high criticality level), social networking (low or medium criticality level of operation) etc.

The service type used during the D2D operation e.g. speech, data, Internet, video messaging etc.

The cell load e.g. the number of D2D UEs 101 operating in a cell, total number of UEs (D2D UEs 101 and UEs 101 not using D2D operation or not capable of D2D operation), number of physical channels (e.g. RBs) used in a cell, hardware resources used in the network node 102 serving the cell, transport network resources used in the network node 102 serving the cell etc.

For example, when the criticality level is high and the D2D UE 101 is in OON coverage or PN coverage, then the D2D UE 101 may be allowed to use a coverage specific parameter which is less stringent, e.g. MPR can be 0 dB. But when the D2D UE 101 is IN coverage then it may have to apply more stringent values of the same parameter, e.g. MPR≥1 dB.

On the other hand, under normal level of criticality (e.g. low or medium) the D2D UE 101 may use more stringent parameter values when operating in OON or PN coverage compared to IN coverage. This is further elaborated with the following examples:

A specific example of a coverage specific parameter such as a radio transmission parameter (e.g. UE maximum output power) that can be defined for different sets of coverage scenarios is shown in table 1 and table 2, i.e. for 2 scenarios and 3 scenarios respectively. For example, the UE maximum power may be lower in an OON coverage scenario to reduce emissions towards other UEs 101 and/or network nodes 102.

TABLE 1

Example of mapping between two coverage scenarios and a radio transmission parameter (e.g. UE maximum output power)

| Radio transmission parameter | Coverage scenario | |
|---|---|---|
| | In coverage | Out of coverage |
| UE max power (dBm) | 23 | 17 |

TABLE 2

Example of mapping between two coverage scenarios and a radio transmission parameter (e.g. UE maximum output power)

| Radio transmission parameter | Coverage scenario | | |
|---|---|---|---|
| | In coverage | Out of coverage | Partial coverage |
| UE max power (dBm) | 23 | 17 | 20 |

Another example of a coverage specific parameter such as a radio transmission parameter (e.g. UE emission control parameter) which is defined for different sets of coverage scenarios is shown in tables 3-4 and tables 5-6, i.e. for 2 scenarios and 3 scenarios respectively. A NS value corresponds to certain A-MPR, which the D2D UE 101 is required to apply when transmitting to another D2D UE 101 or to a network node 102. The NS-value is larger in the OON scenario to ensure that the emissions are reduced when the D2D UE 101 operates in OON coverage scenario where network has no control on the UE 101 operation.

TABLE 3

Example of mapping between two coverage scenarios and a radio emission parameter (e.g. emission control parameter)

| Emission control parameter | Coverage scenario | |
|---|---|---|
| | In coverage | Out of coverage |
| NS_value | 14 | 15 |

TABLE 4

Example of mapping between the required A-MPR and the
emission control parameters: NS_14 and NS_15

| Emission control parameter | A-MPR (dB) |
|---|---|
| NS_14 | 1 |
| NS_15 | 3 |

TABLE 5

Example of mapping between three coverage scenarios and a
radio emission parameter (e.g. emission control parameter)

| | Coverage scenario | | |
|---|---|---|---|
| Emission control parameter | In coverage | Out of coverage | Partial coverage |
| NS_value | 14 | 15 | 16 |

TABLE 6

Example of mapping between the required A-MPR and the emission
control parameters: NS_14, NS_15 and NS_16

| Emission control parameter | A-MPR (dB) |
|---|---|
| NS_14 | 1 |
| NS_15 | 3 |
| NS_16 | 2 |

Method in a D2D UE 101 of Acquiring and Using Coverage Specific Parameters

Steps performed in the D2D UE 101 arranged for performing a D2D operation with at least one second D2D UE 101' comprise at least one of the following (with reference to FIG. 6):

Acquiring coverage specific parameters (step 601).
Determining the network coverage scenario (step 602).
Optional step of selecting a first or second parameter for using/performing the D2D operation (step 603).
Using or applying the acquired parameter in the determined scenario (step 604).

Additional or supplementary or optional steps performed in the D2D UE 101 comprise at least one of the following:

Storing information about usage of coverage specific parameters.
Using stored information related to usage of coverage specific parameters.

The above steps may be performed in the same sequence as mentioned above or in different sequence. The steps illustrated in FIG. 6 are described below:

Acquiring Coverage Specific Parameters

Figure 6:
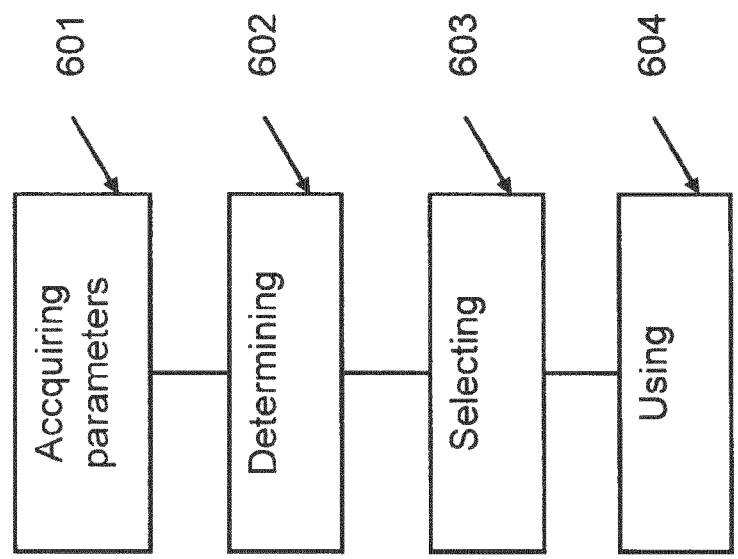
FIG. 6 illustrates schematically a method according to the embodiments herein.

This step is illustrated as step 601 in FIG. 6. In this step 601, the D2D UE 101 acquires one or more coverage specific parameters for use by the first D2D UE 101 for the D2D operation. The same type of parameter may have different values for use in different network coverage scenarios. Said with other words, the D2D UE acquires or obtains or receives at least one coverage specific parameter. The coverage specific parameter may be for two or more coverage scenarios e.g. IN and OON coverage scenarios or IN, OON and PN coverage scenarios. The acquired parameter may be related to transmission, reception or both.

The D2D UE 101 may acquire the parameters by one or more of the following means:

Pre-defined values: In this case, the values of the same parameter(s) are pre-defined for different coverage scenarios. Therefore they are pre-coded in the UE memory (e.g. the memory 202 illustrated in FIG. 5a).

Reception from the network node 102: In this case, the values of the same parameter(s) for different coverage scenarios are received from the network node 102. The D2D UE 102 may receive them from its serving cell (e.g. via RRC signaling) or it may also receive them from another network node (e.g. a neighboring node) by reading its system information. The D2D UE 101 upon receiving this information may store them in its memory 202 for future use.

Reception from another D2D UE 101: In this case, the values of the same parameter(s) for different coverage scenarios are received from another D2D UE 101 when there is a D2D operation. The D2D UE 101 upon receiving this information may also store them in its memory for future use.

Stored or historical data: In this case, the values of the same parameter(s) for different coverage scenarios are obtained from historical data related to the usage of the parameters in different coverage scenarios. For example the D2D UE 101 may select a parameter value which has been repeatedly used in a particular coverage in the past.

In another example, the D2D UE 101 may select a parameter value which has been used in a particular coverage scenario in the past and provides better performance e.g. least amount of radio emissions outside the operating bandwidth or frequency band.

The one or more coverage specific parameters may be at least one first radio parameter and at least one second radio parameter. The first radio parameter may be used for the first D2D UE 101 operating in coverage of a network node 102 during the D2D operation with the at least one second D2D UE 101'. The at least one second radio parameter may be used for the D2D UE 101' operating out of coverage of the network node 102 during the D2D operation with the at least one second D2D UE 101'. If the first D2D UE 101 can communicate with the network node 102 then it may be considered to be operating in coverage with the network node 102.

In some embodiments, the network coverage scenario comprises IN coverage of the network node 102 or OON of the network node 102. In some embodiments, the coverage scenarios comprise at least any two out of: IN coverage, OON coverage and PN coverage. The second D2D UE 101' may assume that it is out of coverage due to Radio Link Failure (RLF).

The first or second radio parameter may be any one or more of: maximum transmit power, emission control parameter, additional spurious emissions, in-band emissions, out of band emission, spectrum emission mask, average transmit power, minimum transmit power, OFF power limit, time mask of uplink signals, number of resource blocks, bandwidth, transport format, MCS, number of transport block, MPR, RRSP, threshold, reference sensitivity power level, or a number of in coverage D2D UE's 101 transmitting. The first radio parameter may be less stringent than the second radio parameter and may depend upon at least one of: a criticality level of the D2D operation, cell load, a service type used during the D2D operation, or a number of D2D UE's 101 in coverage of a cell (e.g. a given legacy cell) serving at least one of the first D2D UE 101 and the second D2D UE 101'.

At least one of the first and second radio parameters may be received from the network node 102. In some embodiments, at least one of the first and second radio parameters are pre-configured, for instance specified in standard or operator specified. In some embodiments, at least one of the first and second radio parameters is received from another D2D UE.

The second radio parameter may be applicable for at least one of: use in out of coverage of the network node 102, over a certain time period (T0), in certain geographical locations and for certain frequency bands or frequencies.

The D2D operation may be at least one of a D2D communication and a D2D discovery.

Determining the Network Coverage Scenario

This is illustrated as step 602 in FIG. 6. In this step, the D2D UE 101 determines the network coverage scenario in which the D2D UE 101 is operating or is expected to operate.

In some embodiments, the network coverage scenario may be determined based on one or more criteria. The criteria may be e.g. the quality of the network link 120, network transmitted signals, a reception quality of a signal received from a network node 102, reception quality of a radio link 120 between the first D2D UE 101 and a network node 102 when the first D2D UE 101 performs a D2D operation with at least one second D2D UE 101', a reception quality of a radio link 120 between the network node 102 and the second D2D UE 101, an ability to synchronize to the network node 102, an ability to read system information of the network node 102 etc. The terms radio link and network link may be used interchangeably when referring to the link between the D2D UE 101 and the network node 102 indicated with the reference number 120 in FIG. 4.

For example, if the D2D UE 101 has an operational network link, e.g. link 120 in FIG. 4, with a network node 102 while carrying out a D2D operation with another D2D UE 101, then it may assume that it is operating in network coverage mode. However, if the D2D UE 101 has lost its network link and/or is unable to establish the network link then it may assume that it is operating in OON coverage scenario or mode. In another example, if the D2D UE 101 does not have a network link but it determines that the other D2D UE 101 with which it communicates has a network link then it may assume that it is operating in PN coverage scenario.

In yet another example, the network node 102 may explicitly indicate to the D2D UE 101 that it cannot provide network coverage starting from a certain pre-defined or configured reference time (e.g. SFN=0 or SFN=512 etc., where SFN is short for System Frame Number). In this case, the D2D UE 101 may either assume that it is in OON coverage or PN coverage. The D2D UE 101 may further verify whether it is in OON or PN coverage after determining the coverage status or scenario in which the other D2D UE 101 is operating.

In yet another example, the D2D UE 101 may further determine its coverage status by attempting to synchronize and/or receive signals and/or to read the system information of one or more cells. For example, if the D2D UE 101 cannot receive any signals (e.g. reference signals, system information etc.) then the D2D UE 101 may assume that it is operating in OON coverage scenario.

The above one or more criteria may also be combined by the D2D UE 101 to determine its coverage status.

The above criteria may also be pre-defined or configured at the D2D UE 101 in order to enable the D2D UE 101 to determine the coverage scenario in which the D2D UE 101 operates. For example, it may be pre-defined that the D2D UE 101 may assume that it is in OON coverage scenario provided one or more of the following conditions are met:

The D2D UE 101 cannot establish communication link with any of the network node;

The D2D UE 101 cannot receive any signal from any of the cells;

Selecting Coverage Specific Parameters

This step is illustrated as step 603 in FIG. 6. In this step 603, the D2D UE 101 selects one or more coverage specific parameters belonging to the acquired one or more coverage specific parameters. The selected one or more coverage specific parameters are applicable to the determined network coverage scenario of the first D2D UE 101.

The step 603 may further comprise selecting the first or second radio parameter for performing the D2D operation. The selection may be based on the determined in coverage or out of coverage of the network node 102.

In some embodiments, the first D2D UE 101 receives permission from the network node 102 to select between the first and second radio parameters for performing the D2D operation.

Using or Applying the Acquired Parameter in the Determined Scenario

This step is illustrated as step 604 in FIG. 6. In this step 604, the D2D UE 101 uses the selected one or more coverage specific parameters for performing the D2D operation in the determined network coverage scenario. In other words, the D2D UE 101, when performing a D2D operation (e.g. D2D communication) with another D2D UE 101, uses at least one parameter which is coverage specific.

The D2D UE 101 may also use other parameters, which are not coverage specific, i.e. the same value that can be used in any coverage scenario.

In step 603, the D2D UE 101 has retrieved the coverage specific parameter(s) obtained in the previous step (e.g. step 601) and selected the values of the parameters which are relevant for the determined coverage scenario in which it is operating. In step 604, the D2D UE 101 then starts communicating with another D2D UE 101 using at least one or more selected parameters.

The usage of coverage specific parameters may also have certain limitations. The limitations may comprise of one or more of the following:

Limited for use over certain time duration (T0), e.g. over 60 seconds from starting the D2D communications.

Limited for use in a certain location or coverage area or zone, e.g. an area defined by a set of geographical coordinates.

Limited for use for a certain number of sessions (K), e.g. up to K=4 sessions until the IN coverage is regained by the D2D UE 101.

The D2D UE 101 may therefore take into account the above limitation of using the coverage specific parameters for D2D communication.

The above limitations of the usage of the parameters may be pre-defined and/or configured at the D2D UE 101 by the serving network node 102 and/or received from another network node 102.

Storing Information About Usage of Coverage Specific Parameters

In this step (not shown in FIG. 6), the D2D UE 101 may also store the information related to the usage of the coverage specific parameters. The D2D UE 101 may also store the parameters which are not coverage specific. The stored information may also map the used parameters (coverage specific and general or remaining parameters) to the coverage in which they are applied.

The D2D UE 101 may also store additional information related to the usage of the parameters. The information may comprise of one or more of the geographical location, time and duration over which the parameters are used.

Using Stored Information

This step is illustrated as step 604 in FIG. 6. The D2D UE 101 may use the stored information related to the coverage specific parameters for one or more of the following purposes:

Using them at a future time for D2D communication in the coverage scenario for which the parameters are applicable.

Signaling the stored information (e.g. statistics collected over a certain time etc.) to the network node 102.

Signaling the stored information (e.g. statistics collected over a certain time etc.) to another D2D UE 101.

Figure 7:
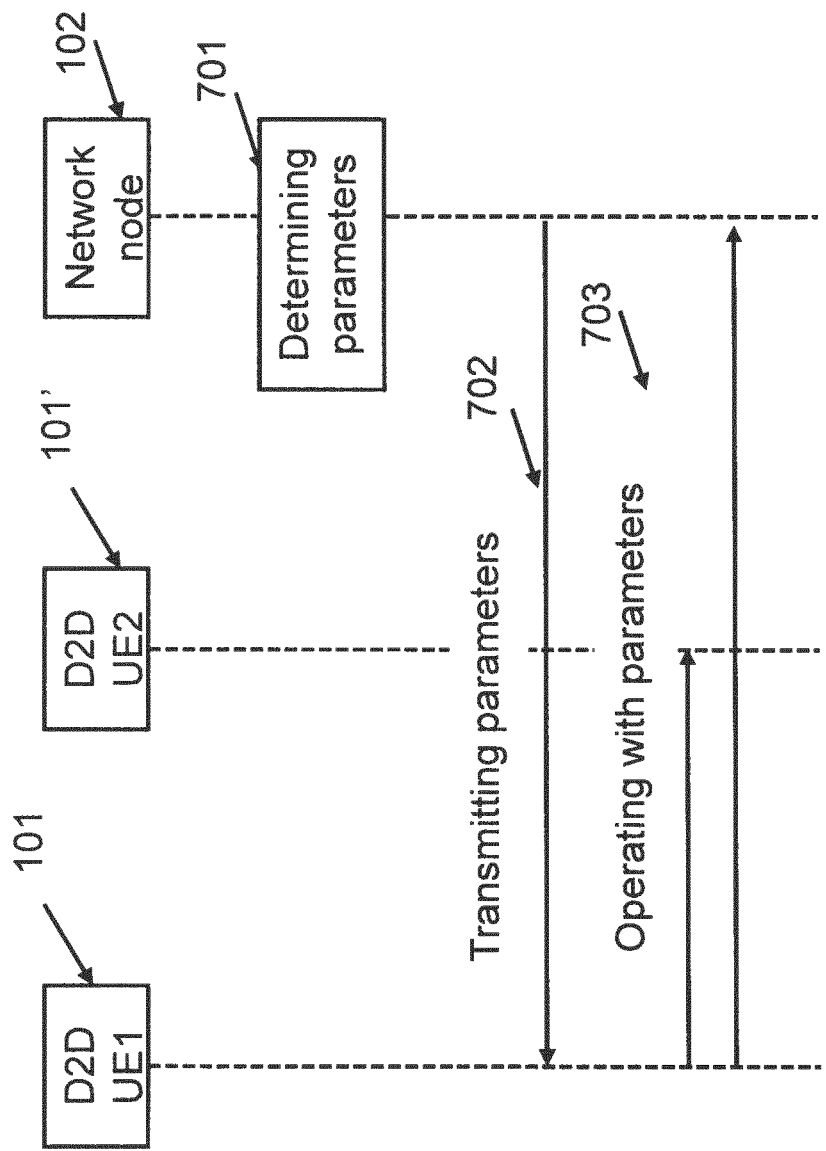
FIG. 7 is a schematic block diagram illustrating an exemplary signalling flow according to the embodiments herein.

Method in a Network Node 102 of Determining and Signaling Coverage Specific Parameters Steps performed in a network node 102 comprise (with reference to FIG. 7):

Determining coverage specific parameters (step 701 in FIG. 7).

Transmitting the determined coverage specific parameters parameter to a D2D UE 102 or to a network node 102 or to both the D2D UE 101, 101' and the network node 102 (step 702 in FIG. 7)

Additional or supplementary or optional steps performed in the network node comprise:

Transmitting the determined coverage specific parameters to another network node 102.

The D2D UE 101 can then use the parameters to perform the D2D operation (step 703 in FIG. 7) in communication with for instance a second D2D UE (e.g. UE2 in FIG. 7) 101'.

The above steps may be performed by the network node 102 in the same sequence as mentioned above or in any other suitable different sequence. The method performed by the network node 102 may be described as being for handling a cell (e.g. a wireless cell). The D2D communication may be operated between D2D UEs 101, 101'. The steps in the method are described below:

Determining Coverage Specific Parameters

This step is illustrated as step 701 in FIG. 7. The network node 102 determines at least one coverage specific parameter for use by a D2D UE 101, 101' in different coverage scenarios. The network node 102 may use one or more criteria to determine one or more parameters specific to the coverage in which D2D UEs 101 can operate. The network node 102 may use the same criteria or a different set of criteria for selecting different coverage specific parameters for D2D operation by the D2D UEs 101, 101'.

The one or more criteria may be a criticality level of the D2D operation, a type of service used during the D2D operation and a load in a cell serving at least one of the first D2D UE 101 and the second D2D UE 101'. The determined at least one coverage specific parameters may be applicable for at least one of: over a certain validity time period T0, in a certain geographical location, for certain frequency bands or frequencies and a number of times over certain duration periods which the parameters can be used.

The determined coverage specific parameters may be any one or more of: maximum transmit power, emission control parameter, additional spurious emissions, in-band emissions, out of band emission, spectrum emission mask, average transmit power, minimum transmit power. OFF power limit, time mask of uplink signals, number of resource blocks, bandwidth, transport format, MCS, number of transport block, MPR, RRSP, threshold, reference sensitivity power level, or a number of in coverage D2D UE's 101, 101' transmitting.

By default, the network node 102 may select or determine the most stringent value of a parameter for the D2D operation in OON coverage, the least stringent value of the same parameter for the D2D operation in IN coverage and a moderate value for the D2D operation in PN coverage. An example of selection based on this criterion is selecting UE maximum output power of 23 dBm, 21 dBm and 19 dBm for D2D operation in IN coverage, PN coverage and OON coverage respectively.

The network node 102 may also use one or more criteria listed in the section "Selection of coverage specific parameters" above for selecting one or more parameters e.g. criticality level, service type and cell load.

The network node 102 may also determine additional information associated with the use or applicability of coverage specific parameters by the D2D UEs 101. The additional information may comprise one or more of: the location where parameters can be used, time period over which parameters can be used, number of times over certain duration the parameters can be used, validity time (i.e. time after which their usage is not allowed) etc.

Transmitting determined parameters parameter to a D2D UE

This step is illustrated as step 702 in FIG. 7. The network node 102 transmits at least one of the determined coverage specific parameters to the D2D UE 101, 101'. In more detail, the network node 102 transmits one or more selected or determined coverage specific parameters to the D2D UEs 101 over a UE specific channel (e.g. PDSCH) and/or via over a broadcast channel. The network node 102 may also transmit one or more additional information related to the usage or applicability of the parameters (e.g. the location as described in the section "Using or applying the acquired parameter in the determined scenario" above).

The network node 102 may transmit the parameters in one or more of the following manner:

Proactively, i.e. regardless of the current coverage of the D2D UEs 101 in the area or regardless of a request from a D2D UE 101.

Based on a request from a D2D UE 101 e.g. a D2D UE 101 sends an explicit request to the network node 102 soliciting the acquisition of one or more coverage specific parameters for any one or more coverage scenario.

Periodically.

On an event triggered basis or when a certain condition is met, e.g. when the cell load increases above a threshold.

At an expected change in coverage of one or more D2D UEs 101 in the area, e.g. when the coverage changes from IN coverage to OON coverage.

At the occurrence of a public safety or public warning situation or when such situation is expected to occur, e.g. based on information received from the core network node or another network node.

Transmitting Determined Coverage Specific Parameters to Another Network Node

The network node 102 may also send the determined or selected coverage specific parameters to another network node 102 (not illustrated in FIG. 7). The network node 102 may also send additional information associated with the selected parameters (e.g. location information of their usage) to another network node 102. Examples of such information includes scheduling information of radio resources (e.g. RBs), resource elements, as well as timing (e.g. frame timing, subframe timing, slot timing etc.) that the D2D transmission will employ (e.g. the timing used by the D2D UE 101 for transmitting and/or receiving signals) in a first network, to allow the second network to avoid potential co-existence interference by allowing the second network to coordinate its transmissions with the D2D transmissions of the first network.

In one example, the network node 102 may send the parameters and additional information of the D2D UE 101 to a target network node 102 of the D2D UE 101. The target network node 102 may use the received information after a cell change of the D2D UE 101.

In another example, the network node 102 may send the parameters and additional information to another network node 102 in case the network node 102 cannot transmit them to the D2D UE 101 directly, e.g. due to lack of radio resources and/or connection with the D2D UE 101. The receiving network node 102 may therefore transmit the parameters and other information to the indicated D2D UE 101.

Method in a D2D UE of Signaling Capability Information Related to Acquiring and Using Coverage Specific Parameters This is illustrated as step 703 in FIG. 7. According to this embodiment, a D2D UE 101 signals a capability information to another node (a network node 102 such as base station, eNodeB, relay, core network (e.g. MME) etc. and/or to other D2D UEs 101) to inform whether the D2D UE 101 is capable of obtaining or acquiring information related to the coverage specific parameters (described in preceding sections) and using them for D2D related operations in the relevant coverage in which the parameters are applicable. More specifically, the D2D UE 101 capability information may indicate whether the D2D UE 101 has the ability to execute one or more procedures related to acquiring and using coverage specific parameters for the D2D operation (i.e. procedures described in the section" Method in a D2D UE 101 of acquiring and using coverage specific parameters" above).

This step may also be described as the network node 102 may receive capability information from the D2D UE 101, 101'. The capability information may comprise that the first D2D UE 101 is capable of at least one of:

Acquiring one or more coverage specific parameters for use by the first D2D UE 101 for the D2D operation.

Using the selected one or more coverage specific parameters for performing the D2D operation in the determined network coverage scenario.

Using other words, the capability information indicates that the first D2D UE 101 is capable of at least one of:

Acquiring (such as step 601 in FIG. 6) one or more coverage specific parameters for use by the first D2D UE 101 for the D2D operation.

Using (such as step 604 in FIG. 6) the selected one or more coverage specific parameters for performing the D2D operation in the determined network coverage scenario.

As mentioned above, the D2D operation may be at least one of D2D communication and D2D Discovery.

The D2D UE 101 capability information may also contain additional or more specific information such as:

The D2D UE 101 can obtain the said information based on any one or more of: pre-defined criteria (also referred to as rules), from a network node 102 and from another D2D UE 101.

A specific list of coverage specific parameters which the D2D UE 101 can obtain and use for the D2D operation e.g. MPR, spectrum emission mask etc.

Frequency bands for which the D2D UE 101 can obtain and use coverage specific parameters for the D2D operation.

The D2D UE 101 reported capability information may also contain any additional information or parameters described in different methods above.

The D2D UE 101 may send the above mentioned capability information to the other node in any of the following manner:

Proactive reporting without receiving any explicit request from the other node (e.g. the serving or any target network node).

Reporting upon receiving any explicit request from the other node (e.g. the serving or any target network node).

The explicit request can be sent to the D2D UE 101 by the other node anytime or at any specific occasion. For example, the request for the capability reporting can be sent to the D2D UE 101 during initial setup or after a cell change (e.g. handover, RRC connection re-establishment, RRC connection release with redirection, Primary cell (PCell) change in Carrier Aggregation (CA), Policy and Charging Control (PCC) change in PCC etc.).

In case of proactive reporting, the D2D UE 101 may report its capability during one or more of the following occasions:

During an initial setup or call setup with the network node 102 or with another D2D UE 101 e.g. when establishing the RRC connection During a cell change e.g. handover, primary carrier change in multi-carrier operation, PCell change in multi-carrier operation, RRC re-establishment, RRC connection release with redirection etc.

The acquired D2D UE 101 capability information may be used by the network node 102 (e.g. eNodeB, base station etc.) and/or by other D2D UEs 101 for performing one or more radio operation tasks or network management tasks. The tasks comprise forwarding the received D2D UE 101 capability information to another network node 102 which may use it after cell change of the D2D UE 101. The network node 102 may also decide, based on the received information, whether to signal one or more coverage specific parameters to the D2D UE 101. In case they are signaled, then also the type of parameters is to be signaled to the D2D UE 101. The other D2D UEs 101 receiving the capability information may use this to perform one or more tasks related to D2D operation such as deciding whether to autonomously obtain the coverage specific parameters or not.

The embodiments herein are applicable to a network node 102 and also a D2D UE 101. The D2D UE 101 can be pre-configured with parameters which are specific to a particular coverage (e.g. IN, OON and PN coverage scenarios). The D2D UE 101 determines its current coverage scenario, selects the corresponding parameters applicable to the determined coverage and uses them for D2D communication.

Some steps performed in a D2D UE 101 comprise:

Obtaining one or more coverage specific parameters for use by the D2D UE 101 for D2D communication. The same type of parameter may have different values for use in different coverage scenarios. Coverage scenarios comprise of at least any two out of: IN coverage, OON coverage and PN coverage.

Determining (e.g. based on one or more criteria such as e.g. the quality of the network link 120 or the network transmitted signals), the coverage in which the D2D UE 101 is operating or is expected to operate.

Selecting one or more parameters belonging to the obtained parameters. The selected one or more parameters are applicable to the determined coverage of the D2D UE 101.

Using the selected one or more parameters for D2D communication in the determined coverage.

Some steps performed in the first D2D UE 101 for performing a D2D operation with at least one second D2D UE 101' may be:

Acquiring or obtaining at least one first radio parameter and at least one second radio parameter. This step may correspond to step 601 described above. The first radio parameter may be to be used for operating in coverage of a network node 102 during the D2D operation with the at least one second D2D UE 101'. The at least one second radio parameter is to be used for operating out of coverage of the network node during the D2D operation with at least one second D2D UE. If the first D2D UE 101 can communicate with the network node 102, then it may be considered to be operating in coverage with the network node 102

Determining whether the first D2D UE 101 is operating in coverage or out of coverage of network node 102 during the D2D operation with the at least one second D2D UE 101'. This step may correspond to step 602 described above.

Selecting the first or second radio parameter for performing the D2D operation. This step may correspond to step 603 described above. The selection is based on the determined in coverage or out of coverage of the network node 102.

Using the at least selected first or second radio parameter for performing the D2D operation. This step may correspond to step 604 described above.

Some steps performed in a network node 102 serving or managing a D2D UE 101 comprise:

Determining (e.g. based on one or more criteria) one or more coverage specific parameters for use by the D2D UE 101 for D2D operation. The same type of parameter may have different values for use in different coverage scenarios. Coverage scenarios comprise of at least any two out of: IN coverage, OON coverage and PN coverage. This step may correspond to step 701 in FIG. 7 described above.

Transmitting the determined one or more coverage specific parameters for at least two different coverage scenarios in which the D2D UE 101 can operate for performing D2D communication. This step may correspond to step 702 in FIG. 7 described above.

Some steps performed in a network node 102 handling a cell (e.g. a wireless cell), wherein the D2D communication may be operated between D2D UEs 101, 101' comprises:

Determining at least one coverage specific parameter for use by a D2D UE 101, 101' in different coverage scenarios. The coverage scenarios comprise at least one of IN coverage, OON coverage or PN coverage. This step may correspond to step 701 in FIG. 7 described above.

Transmitting at least one of the determined coverage specific parameters to the D2D UE 101, 101'. This step may correspond to step 702 in FIG. 7.

In some embodiments, a first D2D UE is arranged to communicate in a D2D wireless communication with at least one second D2D UE 101. Such first D2D UE 101 may comprise a processing unit 211, a memory storage unit 212 and a communication interface 215. The processing unit 211 may be arranged to operate instruction sets stored in the memory storage unit 212 for communicating with the at least one second D2D UE 101' via the communication interface 215. The processing unit 211 may be further arranged for:

Obtaining at least one first radio parameter and at least one second radio parameter. The at least one first radio parameter may be to be used for operating in coverage of a network node 102 during the D2D wireless communication with the at least one second D2D UE 101'. The at least one second radio parameter is to be used for operating out of coverage of the network node 102 during the D2D wireless communication with the at least one second D2D UE 101'. If the first D2D UE 101 can communicate with the network node 102 then it may be considered to be operating in coverage with the network node 102.

Determining whether the first D2D UE 101 is operating in coverage or out of coverage of the network node 102 during the D2D wireless communication with the at least one second D2D UE 101'.

Selecting the first or second radio parameter for performing the D2D wireless communication. The selection may be based on the determined in coverage or out of coverage of the network node 102.

Using the at least selected first or second radio parameter for performing the D2D wireless communication.

In some embodiments, the processing unit 211 is further arranged for transmitting (such as in step 703 in FIG. 7) a capability information to the network node 102 or to another D2D UE. The capability information indicates that the first D2D UE 101 is arranged to being capable of at least one of:

Acquiring (such as in step 601 in FIG. 6) one or more coverage specific parameters for use by the first D2D UE 101 for the D2D operation.

Using (such as in step 604 in FIG. 6) the selected one or more coverage specific parameters for performing the D2D operation in the determined network coverage scenario.

In some embodiments, the first D2D UE 101 may be arranged to communicate in a D2D wireless communication with at least one second D2D UE 101. The first D2D UE 101 may comprise a processing unit 211, a memory storage unit 212 and a communication interface 215. The processing unit 211 may be arranged to operate instruction sets stored in the memory storage unit 212 for communicating with the at least one second D2D UE 101' via the communication interface 215. The processing unit 211 may be further arranged for:

Obtaining one or more coverage specific parameters for use by the first D2D UE 101 for D2D wireless communication. The same type of parameter may have different values for use in different coverage scenarios. The coverage scenarios comprise of at least any two out of: IN coverage, OON coverage and PN coverage.

Determining (e.g. based on one or more criteria such as e.g. the quality of the network link 120 or the network transmitted signals) the coverage in which the first D2D UE 101 is operating or is expected to operate.

Selecting one or more parameters belonging to the obtained coverage specific parameters. The selected one or more parameters are applicable to the determined coverage of the first D2D UE 101.

Using the selected one or more parameters for wireless D2D communication in the determined coverage.

In some embodiments, the network node 102 comprises a processing unit 201, a memory unit 202, and at least one communication interface 205. The processing unit 201 may be arranged to operate instruction sets stored in the memory unit 202 to communicate wirelessly with a first D2D UE 101. The processing node 201 may be further arranged for:

Determining at least one coverage specific parameter for use by the first D2D UE 101 in different coverage scenarios. The coverage scenarios comprise at least one of IN coverage, OON coverage, or PN coverage.

Transmitting at least one of the determined coverage specific parameters to the first D2D UE 101 or to a network node 102 or to both the first D2D UE 101 and the network node 102.

The at least one coverage specific parameter may be determined based on one or more of the following criteria:

A criticality level of the D2D operation.
A type of service used during the D2D operation.
A load in a cell serving at least one of the first D2D UE 101 and the second D2D UE 101'.

The processing unit 201 may also be arranged for receiving capability information from the D2D UE 101, 101'. The capability information may comprise that the first D2D UE 101 is capable of at least one of acquiring one or more coverage specific parameters for use by the first D2D UE 101 for the D2D operation, and using the selected one or more coverage specific parameters for performing the D2D operation in the determined network coverage scenario.

The embodiments described above leads to the advantages of:

The method enables a D2D UE 101 to more efficiently continue the D2D communication regardless of the type of coverage in which the D2D communication takes place.

The transmissions of the D2D UEs 101 do not cause unnecessary or any additional degradation to the other UEs 101 and/or network nodes 102 when operating in PN or OON coverage scenarios.

The D2D UEs 101 can continue their operation in public safety situation e.g. when network nodes 102 are unavailable or partially available.

The network node 102 does not have to always maintain a communication link 120 with D2D UEs 101 though D2D operation can continue. The network node 102 may have resource constraint due to lack of resources, heavy load and disastrous situation.

Summarized, the embodiments herein relate to methods and arrangements in cellular mobile communication systems, in particular for handling D2D operation (e.g. D2D communication) between wireless communication devices. Pre-configured parameters can be set in the terminal. Depending on the coverage scenario, different parameters will be selected and used for D2D operation.

Although terminology from 3GPP LTE (or E-UTRAN) has been used in this disclosure to exemplify the embodiments herein, this should not be seen as limiting the scope of the embodiments herein to only the aforementioned system. Other wireless systems, including WCDMA, UTRA FDD, UTRA TDD, and GSM/GERAN/EDGE, may also benefit from exploiting the ideas covered within this disclosure.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the embodiments herein may be at least in part implemented by means of both hardware and software, and that several "means" or "units" may be represented by the same item of hardware.

The above mentioned and described embodiments are only given as examples and should not be limiting. Other solutions, uses, objectives, and functions within the scope of the embodiments herein as claimed in the below described patent claims should be apparent for the person skilled in the art.

Abbreviations
3GPP $3^{rd}$ Generation Partnership Project
AP Access point
DM Discovery mode
D2D Device-to-device
DMRS Dedicated modulation reference signal
MCS Modulation and coding scheme
RB Resource block
CMAS Commercial Mobile Alert System
EWS Earthquake and Tsunami Warning System
GPS Global Positioning System
LTE Long Term Evolution
MME Mobility Management Entity
OFDM Orthogonal Frequency Division Multiplexing
PLMN Public Land Mobile Network (PLMN)
PRB Physical Resource Block
PWS Public Warning System
E-UTRA(N) Evolution UMTS Terrestrial Radio Access (Network)
MPR Maximum power reduction
A-MPR Additional MPR
WCDMA Wide band code division multiple access
OOB Out of band
UE User Equipment
UMTS Universal Mobile Telecommunications System
PRACH Physical Random Access Channel
RACH Random Access Channel
RAR Random Access Response
PUCCH Physical Uplink Control CHannel
PUSCH Physical uplink shared channel
PDSCH Physical downlink shared channel
RRC Radio Resource Control
PCell Primary Cell
PCC Policy and Charging Control
CA Carrier Aggregation
RLF Radio Link Failure
RRSP Reference Signal Received Power (RSRP) table

The invention claimed is:

1. A method in a first Device-to-Device User Equipment (D2D UE) arranged for performing a Device-to-Device (D2D) operation with a second D2D UE, the method comprising:

the first D2D UE determining that the first D2D UE is in a partial network (PN) coverage scenario, wherein determining that the first D2D UE is in the PN coverage scenario comprises the first D2D UE determining that (i) the first D2D UE is in an out of network (OON) coverage scenario and (ii) the second D2D is in an in network (IN) coverage scenario;

as a result of determining that the first D2D is in the PN coverage scenario, selecting a subset of coverage specific radio parameters from a set of coverage specific radio parameters, wherein the set of coverage specific radio parameters comprises a first coverage specific radio parameter associated only with the IN coverage scenario, a second coverage specific radio parameter associated only with the OON coverage scenario, and a third coverage specific radio parameter associated only with the PN coverage scenario, and wherein the selected subset of coverage specific radio parameters comprises said third coverage specific radio parameter associated only with the PN coverage scenario; and using the selected subset of coverage specific radio parameters for performing the D2D operation.

2. The method according to claim 1, further comprising:
transmitting a capability information to the network node or to another D2D UE, said capability information indicates that the first D2D UE is capable of:
acquiring one or more coverage specific radio parameters for use by the first D2D UE for the D2D operation, and
using the selected one or more coverage specific radio parameters for performing the D2D operation in the determined network coverage scenario.

3. The method according to claim 1, wherein the D2D operation is at least one of a D2D communication and a D2D discovery.

4. The method according to claim 1, further comprising:
determining a network condition, said network condition being at least one of: a reception quality of a signal received from a network node; a reception quality of a radio link between the first D2D UE and a network node when the first D2D UE performs a D2D operation with at least one second D2D UE; a reception quality of the radio link between the network node and the second D2D UE; an ability to synchronize to a network node; and an ability to read system information of the network node;
selecting a network condition parameter based on the determined network condition; and
using the selected subset of coverage specific radio parameters and the selected network condition parameter for performing the D2D operation.

5. The method according to claim 1, wherein the third coverage specific radio parameter is one of: maximum transmit power, emission control parameter, additional spurious emissions, in-band emissions, out of band emission, spectrum emission mask, average transmit power, minimum transmit power, OFF power limit, time mask of uplink signals, number of resource blocks, bandwidth, transport format, Modulation and Coding Scheme, MCS, number of transport block, Maximum Power Reduction, MPR, Reference Signal Received Power, RRSP, threshold, reference sensitivity power level, or a number of in coverage D2D UE's transmitting.

6. The method according to claim 1, wherein the second radio parameter is less stringent than the first radio parameter.

7. The method according to claim 1, wherein at least one of the first and second radio parameters are received from the network node, pre-defined or received from another D2D UE.

8. The method according to claim 1, wherein the first D2D UE receives permission from the network node to select the subset of coverage specific radio parameters from the set of coverage specific radio parameters.

9. The method according to claim 1, wherein the third radio parameter is applicable for at least one of: a certain time period (T0), a certain geographical location and a certain frequency bands or frequencies.

10. A first Device-to-Device User Equipment, D2D UE, arranged for performing a Device-to-Device, D2D, operation with at least one second D2D UE, wherein the first D2D UE comprises:
a processing unit;
a memory storage unit; and
a communication interface;
wherein the processing unit is arranged to operate instruction sets stored in the memory storage unit for communicating with the at least one second D2D UE via the communication interface; and wherein the processing unit is further arranged for:
determining that the first D2D UE is in a partial network (PN) coverage scenario, wherein determining that the first D2D UE is in the PN coverage scenario comprises the first D2D UE determining that (i) the first D2D UE is in an out of network (OON) coverage scenario and (ii) the second D2D is in an in network (IN) coverage scenario;
as a result of determining that the first D2D is in the PN coverage scenario, selecting a subset of coverage specific radio parameters from a set of coverage specific radio parameters, wherein the set of coverage specific radio parameters comprises a first coverage specific radio parameter associated only with the IN coverage scenario, a second coverage specific radio parameter associated only with the OON coverage scenario, and a third coverage specific radio parameter associated only with the PN coverage scenario, and wherein the selected subset of coverage specific radio parameters comprises said third coverage specific radio parameter associated only with the PN coverage scenario; and
using the selected subset of coverage specific radio parameters for performing the D2D operation.

11. The first D2D UE of claim 10, wherein the processing unit is further arranged for:
transmitting a capability information to the network node or to another D2D UE, said capability information indicates that the first D2D UE is capable of:
acquiring one or more coverage specific radio parameters for use by the first D2D UE for the D2D operation, and
using the selected one or more coverage specific radio parameters for performing the D2D operation in the determined network coverage scenario.

12. The first D2D UE of claim 10, wherein the D2D operation is at least one of a D2D communication and a D2D discovery.

13. The first D2D UE of claim 10, wherein the processing unit is further arranged for:
determining a network condition, said network condition being at least one of: a reception quality of a signal received from a network node; a reception quality of a radio link between the first D2D UE and a network node when the first D2D UE performs a D2D operation with at least one second D2D UE; a reception quality of the radio link between the network node and the second D2D UE; an ability to synchronize to a network node; and an ability to read system information of the network node;
selecting a network condition parameter based on the determined network condition; and
using the selected subset of coverage specific radio parameters and the selected network condition parameter for performing the D2D operation.

14. The first D2D UE of claim 10, wherein the third coverage specific radio parameter is one of: maximum transmit power, emission control parameter, additional spurious emissions, in-band emissions, out of band emission, spectrum emission mask, average transmit power, minimum transmit power, OFF power limit, time mask of uplink signals, number of resource blocks, bandwidth, transport format, Modulation and Coding Scheme, MCS, number of transport block, Maximum Power Reduction, MPR, Reference Signal Received Power, RRSP, threshold, reference sensitivity power level, or a number of in coverage D2D UE's transmitting.

15. The first D2D UE of claim 10, wherein the second radio parameter is less stringent than the first radio parameter.

16. The first D2D UE of claim 10, wherein at least one of the first and second radio parameters are received from the network node, pre-defined or received from another D2D UE.

17. The first D2D UE of claim 10, wherein the first D2D UE receives permission from the network node to select the subset of coverage specific radio parameters from the set of coverage specific radio parameters.

18. The first D2D UE of claim 10, wherein the third radio parameter is applicable for at least one of: a certain time period (T0), a certain geographical location and a certain frequency bands or frequencies.

19. A method in a network node for handling a cell, wherein Device-to-Device (D2D) operation may be operated between a first D2D user equipment (D2D UE) and a second D2D UE, the method comprising steps of:
  determining that the first D2D UE is in a partial network (PN) coverage scenario, wherein determining that the first D2D UE is in the PN coverage scenario comprises determining that (i) the first D2D UE is in an out of network (OON) coverage scenario and (ii) the second D2D is in an in network (IN) coverage scenario;
  as a result of determining that the first D2D is in the PN coverage scenario, selecting a subset of coverage specific radio parameters from a set of coverage specific radio parameters, wherein the set of coverage specific radio parameters comprises a first coverage specific radio parameter associated only with the IN coverage scenario, a second coverage specific radio parameter associated only with the OON coverage scenario, and a third coverage specific radio parameter associated only with the PN coverage scenario, and wherein the selected subset of coverage specific radio parameters comprises said third coverage specific radio parameter associated only with the PN coverage scenario; and
  transmitting to the first D2D UE the selected subset of coverage specific radio parameters.

20. The method according to claim 19, further comprising:
  determining a network condition, said network condition being at least one of: a criticality level of the D2D operation; a type of service used during the D2D operation; and a load in a cell serving at least one of the first D2D UE and the second D2D UE;
  selecting a network condition parameter based on the determined network condition; and
  transmitting the selected network condition parameter to the first D2D UE for use in performing the D2D operation.

21. The method according to claim 19, wherein the third coverage specific radio parameter is applicable for at least one of: over a certain validity time period (T0), in a certain geographical location, for certain frequency bands or frequencies and a number of times over certain duration periods which the parameters can be used.

22. The method according to claim 19, wherein the the third coverage specific radio parameter is one of: maximum transmit power, emission control parameter, additional spurious emissions, in-band emissions, out of band emission, spectrum emission mask, average transmit power, minimum transmit power, OFF power limit, time mask of uplink signals, number of resource blocks, bandwidth, transport format, Modulation and Coding Scheme, MCS, number of transport block, Maximum Power Reduction, MPR, Reference Signal Received Power, RRSP, threshold, reference sensitivity power level, or a number of in coverage D2D UE's transmitting.

23. The method according to claim 19, further comprising:
  receiving a capability information from the D2D UE, said capability information indicates that the first D2D UE is capable of at least one of:
  acquiring one or more coverage specific parameters for use by the first D2D UE for the D2D operation, and
  using the selected one or more coverage specific parameters for performing the D2D operation in the determined network coverage scenario.

24. The method according to claim 19, wherein the D2D operation is at least one of D2D communication and D2D Discovery.

25. A network node comprising:
  a processing unit,
  a memory unit, and
  at least one communication interface,
  wherein the processing unit is arranged to operate instruction sets stored in the memory unit to communicate wirelessly with a first Device-to-Device User Equipment (D2D UE) that is operable to perform a D2D operation with a second D2D UE,
  wherein the processing unit is further arranged for:
  determining that the first D2D UE is in a partial network (PN) coverage scenario, wherein determining that the first D2D UE is in the PN coverage scenario comprises determining that (i) the first D2D UE is in an out of network (OON) coverage scenario and (ii) the second D2D is in an in network (IN) coverage scenario;
  as a result of determining that the first D2D is in the PN coverage scenario, selecting a subset of coverage specific radio parameters from a set of coverage specific radio parameters, wherein the set of coverage specific radio parameters comprises a first coverage specific radio parameter associated only with the IN coverage scenario, a second coverage specific radio parameter associated only with the OON coverage scenario, and a third coverage specific radio parameter associated only with the PN coverage scenario, and wherein the selected subset of coverage specific radio parameters comprises said third coverage specific radio parameter associated only with the PN coverage scenario; and
  transmitting to the first D2D UE the selected subset of coverage specific radio parameters.

26. The network node according to claim 25, wherein the processing unit is further arranged for:
  determining a network condition, said network condition being at least one of: a criticality level of the D2D operation; a type of service used during the D2D operation; and a load in a cell serving at least one of the first D2D UE and the second D2D UE;
  selecting a network condition parameter based on the determined network condition; and transmitting the selected network condition parameter to the first D2D UE for use in performing the D2D operation.

27. The network node according to claim 26, wherein the processing unit is further arranged for:
receiving a capability information from the D2D UE, said capability information indicates that the first D2D UE is capable of at least one of:
acquiring one or more coverage specific parameters for use by the first D2D UE for the D2D operation, and
using the selected one or more coverage specific parameters for performing the D2D operation in the determined network coverage scenario.

28. The network node according to claim 26, wherein the D2D operation is at least one of D2D communication and D2D Discovery.

29. The network node according to claim 25, wherein the third coverage specific radio parameter is applicable for at least one of: over a certain validity time period (T0), in a certain geographical location, for certain frequency bands or frequencies and a number of times over certain duration periods which the parameters can be used.

30. The network node according to claim 25, wherein the third coverage specific radio parameter is one of: maximum transmit power, emission control parameter, additional spurious emissions, in-band emissions, out of band emission, spectrum emission mask, average transmit power, minimum transmit power, OFF power limit, time mask of uplink signals, number of resource blocks, bandwidth, transport format, Modulation and Coding Scheme, MCS, number of transport block, Maximum Power Reduction, MPR, Reference Signal Received Power, RRSP, threshold, reference sensitivity power level, or a number of in coverage D2D UE's transmitting.

* * * * *